US011438226B2

(12) United States Patent
Engi et al.

(10) Patent No.: US 11,438,226 B2
(45) Date of Patent: Sep. 6, 2022

(54) IDENTIFICATION OF NETWORK DEVICE CONFIGURATION CHANGES

(71) Applicant: Cisco Technology, Inc., San Jose, CA (US)

(72) Inventors: Derek William Engi, Ferndale, MI (US); Gonzalo Salgueiro, Raleigh, NC (US); M. David Hanes, Lewisville, NC (US); Bradley Wise, Sunnyvale, CA (US); Md Atiqur Rahman, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/165,364

(22) Filed: Feb. 2, 2021

(65) Prior Publication Data

US 2022/0247630 A1    Aug. 4, 2022

(51) Int. Cl.
*H04L 41/0816* (2022.01)
*H04L 41/08* (2022.01)
*H04L 41/0604* (2022.01)
*H04L 41/22* (2022.01)
*H04L 41/085* (2022.01)

(52) U.S. Cl.
CPC ...... *H04L 41/0816* (2013.01); *H04L 41/0627* (2013.01); *H04L 41/085* (2013.01); *H04L 41/0883* (2013.01); *H04L 41/22* (2013.01)

(58) Field of Classification Search
None
See application file for complete search history.

(56) References Cited

U.S. PATENT DOCUMENTS

| 9,037,464 | B1 | 5/2015 | Mikolov et al. |
| 10,462,010 | B2 | 10/2019 | Bevemyr et al. |
| 10,469,307 | B2 | 11/2019 | Nucci et al. |
| 10,992,543 | B1* | 4/2021 | Rachamadugu .... H04L 41/0695 |
| 2015/0128267 | A1 | 5/2015 | Gupta et al. |
| 2016/0149771 | A1 | 5/2016 | Prasad et al. |

(Continued)

OTHER PUBLICATIONS

Tomas Mikolov et al., "Distributed Representations of Words and Phrases and their Compositionality", arXiv:1310.4546v1 [cs.CL], Oct. 16, 2013, 9 pages.

(Continued)

*Primary Examiner* — Brian Whipple
(74) *Attorney, Agent, or Firm* — Edell, Shapiro & Finnan, LLC

(57) ABSTRACT

In one example, a logical representation of a first graph is generated. The first graph indicates a configuration of a network device in a network at a first time. The first graph includes a first node representative of a first configuration block of the network device, a second node representative of a second configuration block of the network device, and a first link that indicates, by connecting the first node and the second node, that the first configuration block is associated with the second configuration block. The logical representation of the first graph is compared to a logical representation of a second graph that indicates an actual or planned configuration of the network device at a second time subsequent to the first time. In response, one or more changes in the configuration of the network device from the first time to the second time are identified.

20 Claims, 18 Drawing Sheets

(56) References Cited

U.S. PATENT DOCUMENTS

| | | |
|---|---|---|
| 2016/0352572 A1 | 12/2016 | Mishra et al. |
| 2017/0163485 A1 | 6/2017 | Rokui et al. |
| 2017/0318128 A1 | 11/2017 | Ananthanarayanan et al. |
| 2018/0314956 A1 | 11/2018 | Biswas et al. |
| 2019/0253437 A1 | 8/2019 | Barak et al. |
| 2019/0303469 A1 | 10/2019 | Makovsky et al. |
| 2019/0306023 A1 | 10/2019 | Vasseur et al. |
| 2020/0007381 A1 | 1/2020 | Nucci et al. |
| 2020/0076837 A1 | 3/2020 | Ladnai et al. |

OTHER PUBLICATIONS

Tomas Mikolov et al., "Efficient Estimation of Word Representations in Vector Space", arXiv:1301.3781v3 [cs.CL], Sep. 7, 2013, 12 pages.

Jay Johnston et al., "Visualizing a Network Connection's Overall Health and Providing Actionable Information", Cisco Systems, Inc., Nov. 1, 2012, 9 pages.

Xinjun Zhang et al., "Measuring and Visualizing User Sentiment Changes Over Multiple Channels", Technical Disclosure Commons, Oct. 24, 2019, 7 pages.

Clarabridge, "What is Intelligent Scoring?", retrieved from Internet Jan. 15, 2021, 9 pages.

SAS office, "How can we use promoter scores to understand ROI?", 2014, 2 pages.

Cisco, "Release Notes for Cisco Pulse Release 1.0.5", May 17, 2010, 16 pages.

Cisco, "Cisco Pulse API Reference Guide", May 2010, 200 pages.
Cisco, "Cisco Pulse Administrator Guide", May 2010, 270 pages.
Cisco, "Cisco Pulse User Guide", May 2010, 150 pages.

Byron Dom et al., "Graph-Based Ranking Algorithms for Email Expertise Analysis", DMKD'03, Jun. 13, 2003, 8 pages.

Christopher S. Campbell et al., "Expertise Identification using Email Communications", CIKM'03, Nov. 3-8, 2003, 5 pages.

Jun Zhang et al., "Searching For Expertise in Social Networks: A Simulation of Potential Strategies", GROUP'05, Nov. 6-9, 2005, 10 pages.

Ching-Yung Lin et al., "SmallBlue: Social Network Analysis for Expertise Search and Collective Intelligence", IEEE International Conference on Data Engineering, retrieved from Internet Jan. 15, 2021, 4 pages.

Michael D. Lee et al., "A Model-Based Approach to Measuring Expertise in Ranking Tasks", retrieved from Internet Jan. 15, 2021, 6 pages.

Cisco, "Create Templates to Automate Device Configuration Changes", retrieved from Internet Jan. 15, 2021, 12 pages.

Cisco, "Managing Multiple Networks with Configuration Templates", Meraki, retrieved from Internet Jan. 15, 2021, 11 pages.

Anuta Networks, "Multi-Vendor Network Compliance Management", 2020, 12 pages.

Yoan Chabot et al., "A complete formalized knowledge representation model for advanced digital forensics timeline analysis", retrieved from Internet Jan. 15, 2021, 11 pages.

Doantam Phan, "Supporting the Visualization and Forensic Analysis of Network Events", Stanford University, Dec. 2007, 128 pages.

Ca, "Network Fault Manager", 2008, 18 pages.

ManageEngine, "Network Change Monitoring", retrieved from Internet Jan. 15, 2021, 7 pages.

Solarwinds, "Network Configuration Change Management", retrieved from Internet Jan. 15, 2021, 6 pages.

Cisco, "Create Templates to Automate Device Configuration Changes", retrieved from Internet Jan. 15, 2021, 64 pages.

* cited by examiner

| SR Data | DeviceID | Product Family |
|---|---|---|
| [SR Number 1, Crashed, Sev1, Escalated, Requeues 6, Engs 8, BugID 13, Sentiment: 10, TTR 20 Days, CreationDate 2020-01-29] | 12074214 | Network Equipment Vendor A, Series XYZ Switches |
| [SR Number 2, Reloading, Sev2, Escalated, Requeues 2, Engs 3, BugID 13, Sentiment: 65, TTR 5 Days, CreationDate 2020-05-13] | 18907461 | Network Equipment Vendor A, Series XYZ Switches |
| [SR Number 3, RMA, Sev3, Not Escalated, Requeues 3, Engs 2, BugID 10, Sentiment: 70, TTR 4 Days, CreationDate 2020-05-20] | 18907461 | Network Equipment Vendor A, Series XYZ Switches |

| DeviceID | Product Family | Date | Config Change Snippets |
|---|---|---|---|
| 12074214 | Network Equipment Vendor A, Series XYZ Switches | 2020-01-13 | [interface gigabitethernet duplex full, 'vlan_<NUM>',] |
| 12074214 | Network Equipment Vendor A, Series XYZ Switches | 2020-01-13 | [interface gigabitethernet duplex full, 'vlan_<NUM>', 'vlan_<NUM>'] |
| 12074214 | Network Equipment Vendor A, Series XYZ Switches | 2020-01-13 | [interface gigabitethernet duplex full, 'vlan_<NUM>', 'vlan_<NUM>', 'interface_vlan<NUM>'] |
| 12074214 | Network Equipment Vendor A, Series XYZ Switches | 2020-01-13 | [interface gigabitethernet duplex full, 'vlan_<NUM>', 'vlan_<NUM>', 'interface_vlan<NUM>', 'hsrp_<NUM>'] |

| SR Data | DeviceID | Product Family | Date | Most Recent Config Change Snippets |
|---|---|---|---|---|
| [SR Number 1, Crashed, Sev1, Escalated, Requeues 6, Engs 8, BugID 13, Sentiment: 10, TTR 20 Days, CreationDate 2020-01-29] | 12074214 | Network Equipment Vendor A, Series XYZ Switches | 2020-01-13 | ['interface_gigabitethernet_duplex full', 'vlan_<NUM>'] |
| [SR Number 4, Crashed, Sev2, Escalated, Requeues 9, Engs 7, BugID 13, Sentiment: 14, TTR 25 Days, CreationDate 2019-07-12] | 19074512 | Network Equipment Vendor A, Series XYZ Switches | 2019-04-15 | ['interface_gigabitethernet_duplex full', 'vlan_<NUM>', 'vlan_<NUM>', 'interface_vlan<NUM>'] |
| [No SR Found] | 16078515 | Network Equipment Vendor A, Series XYZ Switches | 2019-07-10 | ['interface_ethernet_ip_router_eigrp_iccu-eigrp', 'interface_ethernet_no_shutdown'] |

FIG.8

1000 COMPARISON DB OF CONFIG CHANGES & SR ANALYTICS

| Similar Config Change Groupings by Configuration Vectorization Model | #SRs opened | #SRs did not open | SR Probability | Avg. SR Analytics | Norm. Avg. SR Analytics | Confidence Score (CS) |
|---|---|---|---|---|---|---|
| [interface ethernet switchport trunk allowed vlan <num>] | 3 | 7 | 0.3 | Avg. Sev 3.5<br>Avg. Req 2.5<br>Avg. Sent 0.67<br>Avg. TTR 2.5 D | Avg. Sev 0.17<br>Avg. Req 0.11<br>Avg. Sent 0.13<br>Avg. TTR 0.18<br>SR Prob 0.14 | 0.73 |
| [interface gigabitethernet duplex full, 'vlan_<NUM>',]<br>[interface gigabitethernet duplex full, 'vlan_<NUM>', 'vlan_<NUM>']<br>[interface gigabitethernet duplex full, 'vlan_<NUM>', 'vlan_<NUM>', 'interface_vlan<NUM>']<br>[interface gigabitethernet duplex full, 'vlan_<NUM>', 'vlan_<NUM>', 'interface_vlan<NUM>', hsrp_<NUM>] | 7 | 8 | 0.47 | Avg. Sev 1.5,<br>Avg. Req 4.5,<br>Avg. Sent 0.20<br>Avg. TTR 20.5 D, | Avg. Sev 0.14<br>Avg. Req 0.05<br>Avg. Sent 0.04<br>Avg. TTR 0.09<br>SR Prob 0.10 | 0.33 ⊖ |
| [ip-mtu-1400, tcp-adjust-mss-1360] | 0 | 15 | 0 | 0 | 0 | 1 |

FIG.10

IDENTIFICATION OF NETWORK DEVICE CONFIGURATION CHANGES

TECHNICAL FIELD

The present disclosure relates to computer networking.

BACKGROUND

A network manager/administrator can change the state of a network device through configuration changes to maintain and operate customer network environments. Network devices need to be configured properly to ensure optimal network performance. A high proportion of network service outages/disruptions/degradations are caused by a misapplied network device configuration or some other configuration-related mistake initiated via human intervention. For example, some configuration changes can lead to interruption of network operations and unintended problems (e.g., poor network performance, device crashes, reboots, device reloads, etc.). Such outages/disruptions/degradations are costly for network managers as well as enterprise customers.

BRIEF DESCRIPTION OF THE DRAWINGS

FIG. 6 illustrates a database configured to store Service Request (SR) data, according to an example embodiment.

FIG. 7 illustrates a database configured to store configuration changes, according to an example embodiment.

FIG. 8 illustrates a database configured to store SR data and/or configuration changes, according to an example embodiment.

FIG. 10 illustrates a database configured to store configuration scores associated with configuration changes, according to an example embodiment.

DESCRIPTION OF EXAMPLE EMBODIMENTS

Overview

Techniques are described herein for identifying one or more configuration changes to one or more network devices. In one example embodiment, a logical representation of a first graph is generated. The first graph indicates a configuration of a network device in a network at a first time. The first graph includes a first node representative of a first configuration block of the network device, a second node representative of a second configuration block of the network device, and a first link that indicates, by connecting the first node and the second node, that the first configuration block is associated with the second configuration block. The logical representation of the first graph is compared to a logical representation of a second graph that indicates an actual or planned configuration of the network device at a second time subsequent to the first time. In response to comparing the first graph and the second graph, one or more changes in the configuration of the network device from the first time to the second time are identified.

Example Embodiments

Figure 1:
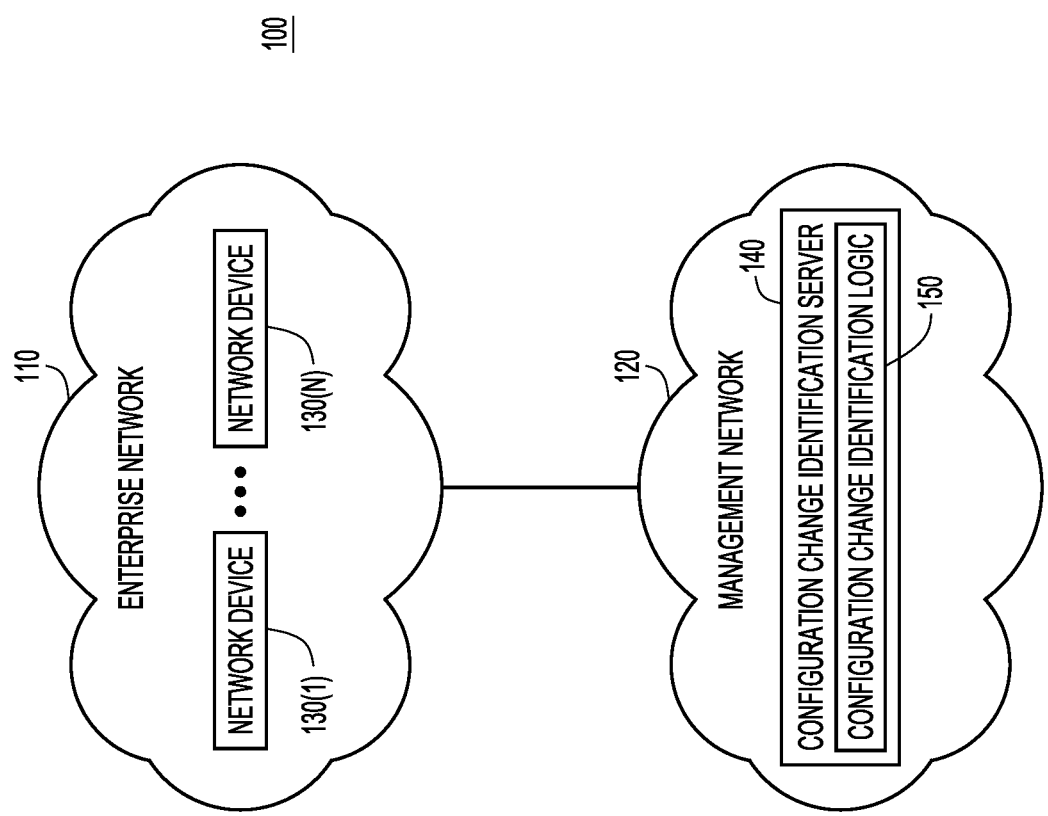
FIG. 1 illustrates a system configured to identify one or more network device configuration changes, according to an example embodiment.

FIG. 1 illustrates an example system 100 configured to identify one or more network device configuration changes/differences. System 100 includes enterprise network 110 and management network 120. Enterprise network 110 includes network devices 130(1)-130(N). Network devices 130(1)-130(N) may have respective configurations. A configuration may include an aggregation/collection/combination of configuration blocks defined for a particular section or technology in a given configuration. Configuration blocks may include configuration/software snippets, lines, commands, changes, items, etc. Management network 120 may be responsible for providing one or more services for enterprise network 110, such as providing one or more services for network devices 130(1)-130(N).

During the course of operation, a network administrator of enterprise network 110 may update the network device configuration(s) of network devices 130(1)-130(N). As a result, configurations of network devices 130(1)-130(N) may frequently change. If the network administrator misconfigures one or more of network devices 130(1)-130(N), the configuration changes can cause one or more networking issues with enterprise network 110 (e.g., major network events such as service/network disruption or outage).

Conventionally, however, it can be difficult or even impossible to discover how or why the network issue(s) occurred. In particular, because of the complexity of enterprise network 110 and the configurations of network devices 130(1)-130(N), a network administrator alone may be unable to determine whether a misconfiguration caused the network issue(s), or to identify the misconfiguration. Accordingly, resolving the networking issue(s) can typically require an inordinate amount of time, resulting in wasted downtime and loss of productivity. Furthermore, the networking issue(s) might arise repeatedly if the network administrator is unaware of the misconfiguration and subsequently makes the same or similar configuration changes.

Therefore, in order to improve both the resolution speed and future prevention of networking issues caused by network device misconfiguration, configuration change identification server 140 is provided in management network 120. Configuration change identification server 140 includes configuration change identification logic 150, which may be configured to cause configuration change identification server 140 to programmatically collect one or more configurations of network devices 130(1)-130(N) from enterprise network 110, implement graph-based techniques to identify changes in configurations of network devices 130(1)-130(N), and/or provide a network forensic timeline of configuration change events. Configuration change identification logic 150, or any suitable portion thereof, may be provided in any suitable entity or entities. For example, configuration change identification logic 150 may be also/alternatively be provided in network devices 130(1)-130(N).

Techniques described herein may enable examination of past events and intelligent determination as to which events led to the networking issue(s) by determining the last known working state of a network device and the potential impact of the misconfiguration on other network devices. Network forensics may be applied to network configuration changes in order to provide fault isolation that points to the misconfiguration(s) that likely caused the networking issue(s) and also provide early warnings to risky changes and configuration behavior. Configuration change data may be analyzed to provide improved insights into the cause of existing networking issue(s) and/or future potential networking issue(s). Therefore, technical improvements achieved by the presented embodiments may involve proactively addressing and minimizing networking issues due to misconfigurations in a network and quickly resolving networking issues in a fully- or semi-automated manner.

Figure 2A:
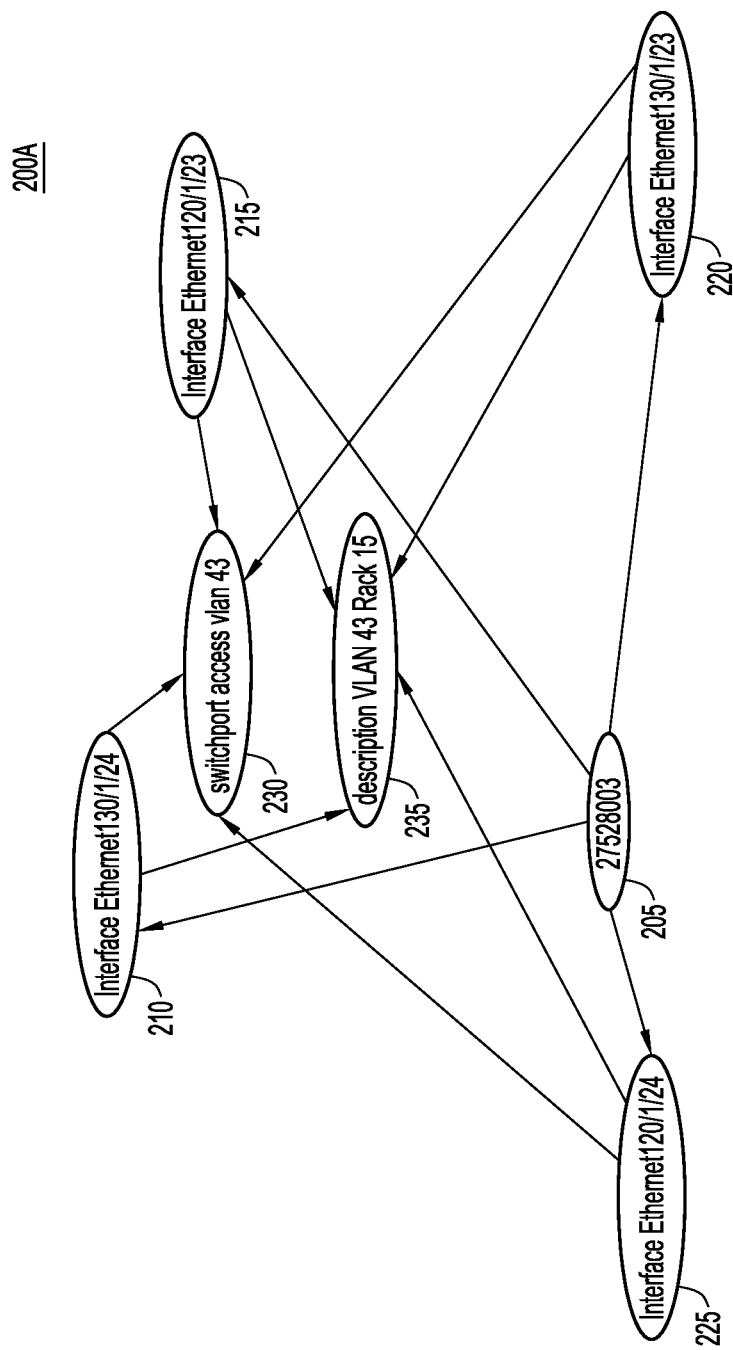
FIG. 2A illustrates a graph that indicates a network device configuration at a first time, according to an example embodiment.

With continued reference to FIG. 1, FIGS. 2A-2C illustrates example graphs 200A-200C, respectively, which may be used by configuration change identification server 140 to identify configuration changes in network device 130(1). Turning first to FIG. 2A, shown is graph 200A, which indicates a configuration of network device 130(1) at a first time. In one example, configuration change identification server 140 may generate a logical representation of graph 200A, such as a graph database.

Graph 200A includes nodes 205-235 and links (represented by arrows) connecting respective nodes of nodes 205-235. Node 205 is representative of an identifier of network device 130(1). Nodes 210-235 are representative of respective configuration blocks of network device 130(1). The links indicate, by connecting respective ones of nodes 205-235, that a first configuration block is associated with a second configuration block. For example, the link connecting node 210 with node 230 indicates that the configuration block "interface Ethernet 130/1/24" is associated with the configuration block "switchport access vlan 43."

Figure 2B:
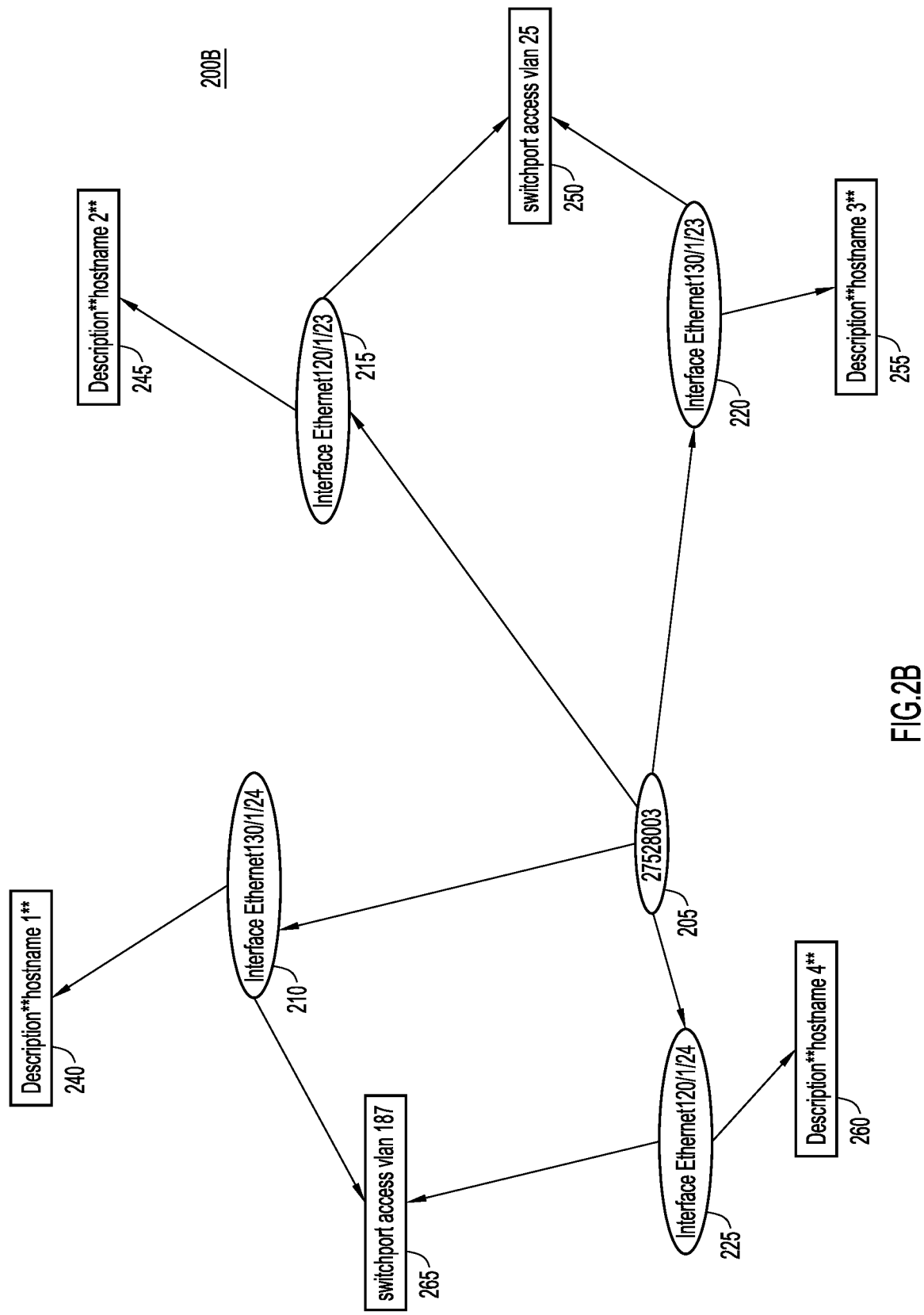
FIG. 2B illustrates a graph that indicates a network device configuration at a second time, according to an example embodiment.

FIG. 2B illustrates graph 200B, which indicates an actual or planned configuration of network device 130(1) at a second time. In one example, configuration change identification server 140 may generate a logical representation of graph 200B. Graph 200B includes nodes 205-225 and 240-265, and links (represented by arrows) connecting respective nodes of nodes 205-225 and 240-265. Like nodes 210-235, nodes 240-265 are representative of respective configuration blocks of network device 130(1).

The links indicate, by connecting respective nodes of nodes 205-225 and 240-265, that a first configuration block is associated with a second configuration block. For example, the link connecting node 210 with node 240 indicates that the configuration block "interface Ethernet 130/1/24" is associated with the configuration block "description  hostname 1 ." Graph 200B also excludes node 230 and node 235, as well as the links connecting node 230 and node 235 with nodes 210-225.

Configuration change identification server 140 may compare the logical representation of graph 200A to the logical representation of graph 200B and, in response, identify one or more configuration changes in network device 130(1) from the first time to the second time, that is, as between a state of network device 130(1) in enterprise network 110 at the first time instance and a state of the network device 130(1) in enterprise network 110 some time interval later corresponding to the second time instance. Configuration change identification server 140 may identify the one or more configuration changes by observing that: nodes 205-220 are present in both graph 200A and graph 200B; nodes 230 and 235 are present in graph 200A but not in graph 200B; and nodes 240-265 are present in graph 200B but not in graph 200A.

Figure 2C:
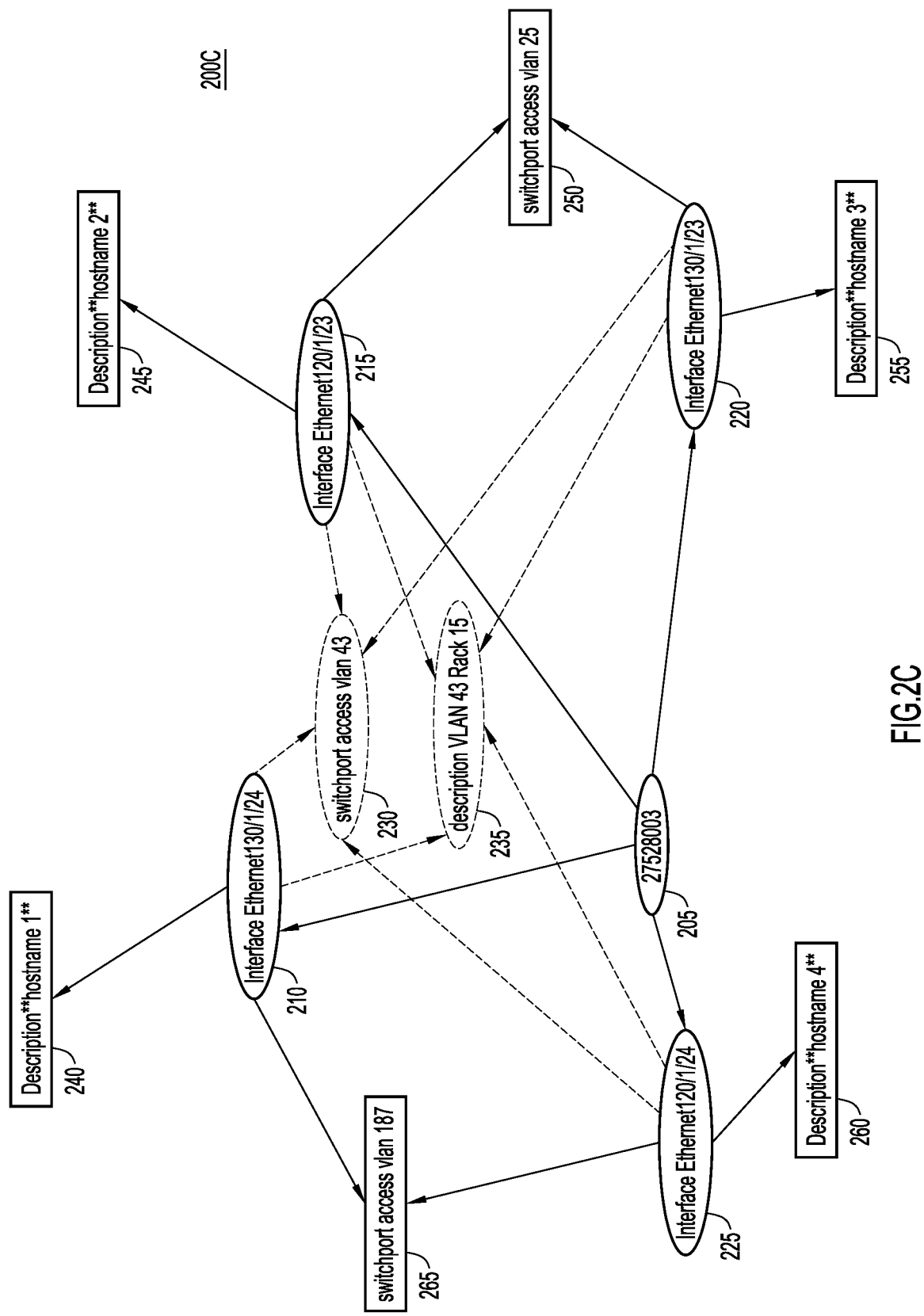
FIG. 2C illustrates a graph that indicates one or more network device configuration changes from the first time to the second time, according to an example embodiment.

FIG. 2C illustrates graph 200C, which indicates the one or more configuration changes in network device 130(1) from the first time to the second time. Configuration change identification server 140 may generate a logical representation of graph 200C in order to assist with the identification of the one or more configuration changes. In particular, configuration change identification server 140 may compare graph 200A and graph 200B for common node and link pairings to determine that nodes 230 and 235 (and all corresponding links) have been removed, and that nodes 240-265 (and all corresponding links) have been added, from/to the configuration of network device 130(1).

In one specific example, configuration change identification server 140 may determine that the actual or planned configuration of network device 130(1) adds an association of respective configuration blocks. For instance, configuration change identification server 140 may determine that the actual or planned configuration of network device 130(1) adds an association of the configuration block "description  hostname 1 " with the configuration block "interface Ethernet 130/1/24." Configuration change identification server 140 may make this determination based on the presence of node 210, node 240, and the link connecting node 210 and node 240.

In another specific example, configuration change identification server 140 may determine that the actual or planned configuration of network device 130(1) removes an association of respective configuration blocks. For instance, configuration change identification server 140 may determine that the actual or planned configuration of network device 130(1) removes an association of the configuration block "interface Ethernet 130/1/24" with the configuration block "switchport access vlan 43." Configuration change identification server 140 may make this determination based on the presence of node 210, node 240, and the link connecting node 210 and node 240.

Graphs 200A-200C are directed graphs in which the links are directed from a first node of nodes 210-265 to a second node of node 210-265. For example, the link connecting node 210 and node 230 is directed from node 210 to node 230, and the link connecting node 210 and node 240 is directed from node 210 to node 240. The directed graphs may enable the extraction and analysis of context found in the original configuration text. For example, node 210 is a parent node of nodes 230 and 240, and nodes 230 and 240 are children nodes of node 210. This indicates that the configuration block "interface Ethernet 130/1/24" is higher in the hierarchy than the configuration block "switchport access vlan 43" and the configuration block "description  hostname 1 ."

The configuration differences of network device 130(1) may be interpreted as a graph database (e.g., as represented by graph 200C) to preserve the hierarchical nature and parent-child relationships found in the configuration text. Taking snapshots of network configurations over time (e.g., as represented by graphs 200A and 200B) and converting the network configurations to a graph hierarchy (e.g., as represented by graph 200C) may preserve the hierarchy of the configuration. This may enable configuration change identification server 140 to compare configurations over time and extract a chain of events focused on configuration changes. In one example, configuration change identification server 140 may generate graphs on a per-device basis (e.g., graphs 200A-200C correspond to network device 130(1)).

Configuration change identification server 140 may associate certain metadata with one or more configuration changes. In one example, the metadata may include one or more timestamps of the one or more configuration changes. The one or more timestamps may indicate a time at which the one or more configuration changes occurred. Configuration change identification server 140 may compute the one or more timestamps and associate the one or more timestamps with the one or more configuration changes.

In another example, the metadata may include one or more implementers of the one or more configuration changes. The one or more implementers may include a user (e.g., network administrator) or process (e.g., software program) that implemented the change. Configuration change identification server 140 may identify the one or more implementers and associate the one or more implementers with the one or more configuration changes.

Figure 3A:
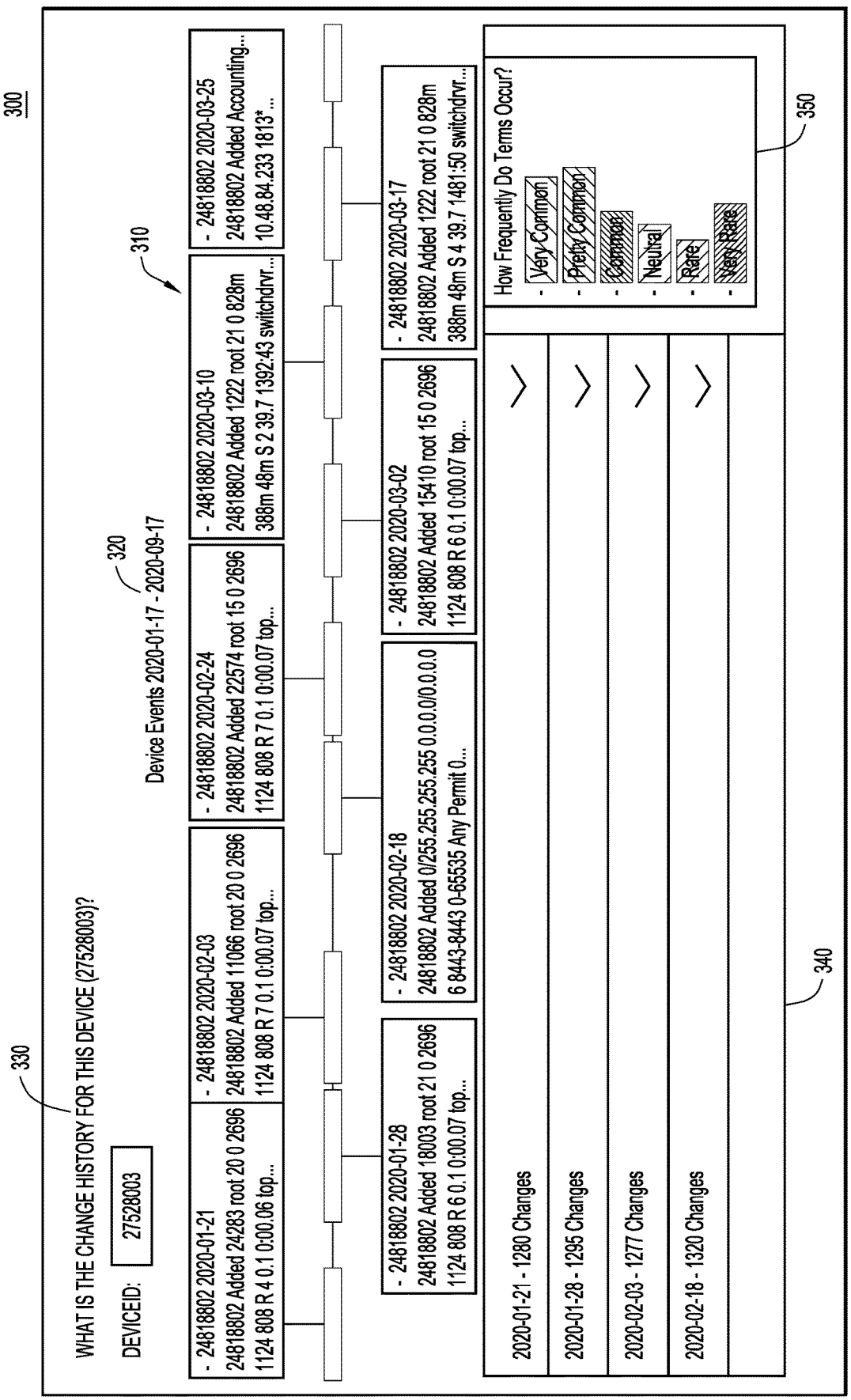
FIGS. 3A and 3B collectively illustrate a graphical user interface that includes a timeline of one or more network device configuration changes and indicates a historical frequency associated with one or more network device configuration blocks, according to an example embodiment.

With continued reference to FIG. 1, FIG. 3A illustrates an example graphical user interface 300. Graphical user interface 300 includes timeline 310 of one or more changes in the configuration of network device 130(1), an indication 320 of a time range covered by timeline 310, and an indication 330 of the network device that experienced the configuration change(s) displayed in timeline 310 (here, network device 130(1)). Graphical user interface 300 further includes a list 340 of individual configuration changes by date, and a key 350 indicating possible historical frequencies associated with one or more configuration blocks of network device 130(1). Configuration change identification server 140 may generate graphical user interface 300, including timeline 310.

Timeline 310 may serve as a function for analyzing configuration change behavior of network device 130(1) over time to optimize fault isolation and even outage prediction. In particular, timeline 310 may summarize how and when the configuration of network device 130 has changed over time. Indication 320 may include any suitable indication of the time range, such as a range of dates. Indication 330 may include a search bar configured to accept user input. For example, when a user inputs the device identifier of network device 130(1), configuration change identification server 140 may generate timeline 310, which displays configuration changes experiences by network device 130(1). The user may thus prompt configuration change identification server 140 to generate one or more respective timelines corresponding to any of network devices 130(1)-130(N).

Figure 3B:
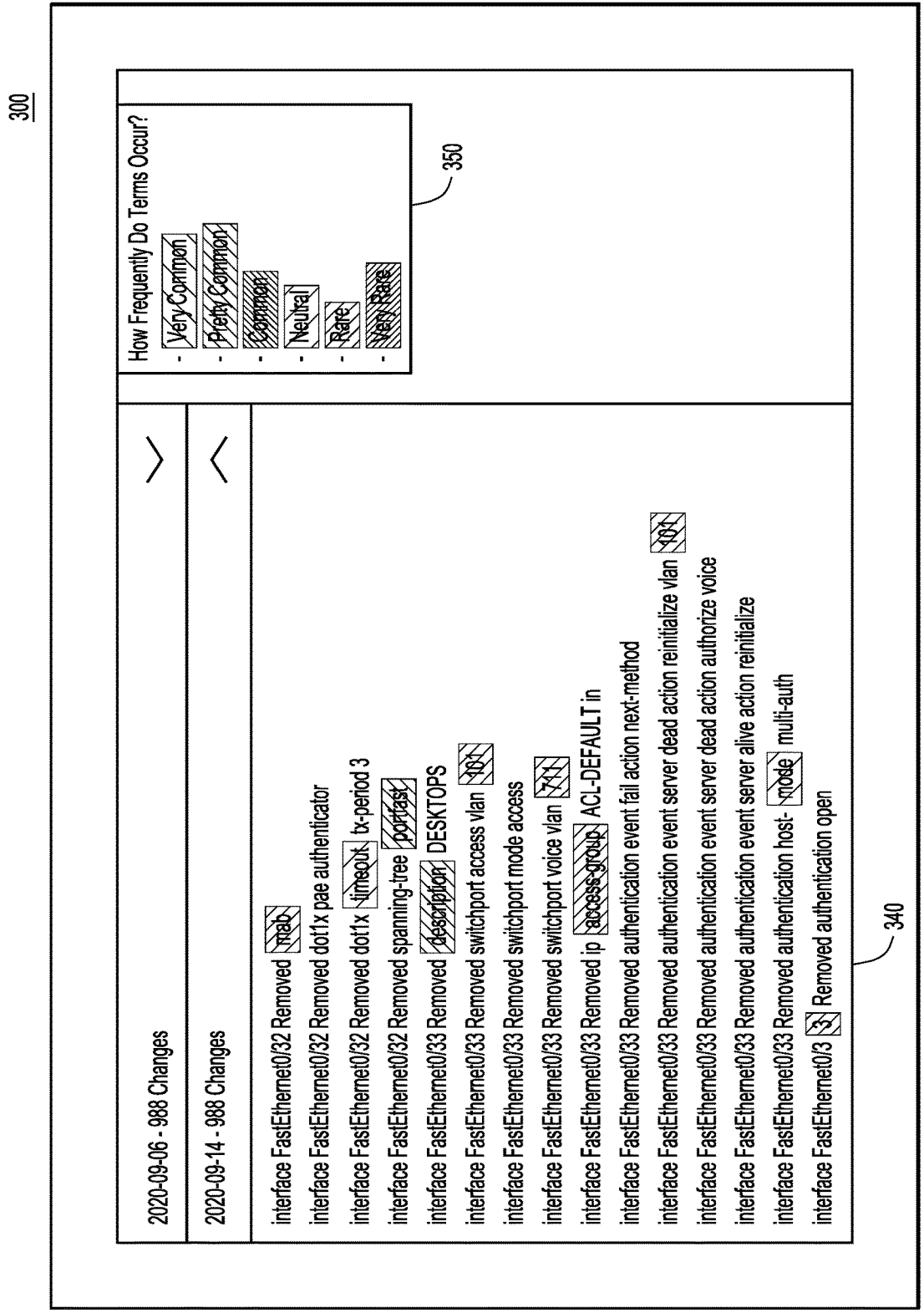

Turning now to FIG. 3B, and with continued reference to FIGS. 1 and 3A, list 340 and key 350 are described in greater detail. As shown, list 340 includes a number of dropdown lists each corresponding to a date of a configuration change on network device 130(1). In this example, the user has selected the dropdown list corresponding to the 998 configuration changes that were implemented on Sep. 14, 2020. The dropdown list displays the configuration changes relative to the previous configuration settings of network device 130(1). Configuration change identification server 140 may determine configuration changes using a graph-based approach, as discussed above in relation to FIGS. 2A-2C.

In one example, configuration change identification server 140 may calculate a historical frequency associated with one or more configuration blocks displayed in the Sep. 14, 2020 dropdown list. List 340 and key 350 may indicate the historical frequency of those configuration blocks. For example, the configuration change shown at the top of the dropdown list ("interface FastEthernet0/32 Removed mab") indicates that the keyword/term "mab" was removed from "interface FastEthernet0/32," and further indicates that "mab" has a low historical frequency (e.g., "mab" is "rare").

The historical frequency for a given keyword may be calculated based on any suitable factor(s). For example, the historical frequency may be calculated for any suitable amount of time in the past (e.g., one or more days, weeks, months, years, etc.), based on any suitable number of any suitable devices (e.g., network device 130(1), all network devices in the product family of network device 130(1), all network devices in enterprise network 110, etc.), or based on the implementer of a given configuration change (e.g., an organization, a network administrator, a software process, etc.).

It will be appreciated that while the configuration on Sep. 14, 2020 is an actual configuration (e.g., the user has already implemented the configuration on network device 130(1)), the techniques described herein with respect to FIGS. 3A and 3B may also apply to a planned configuration (e.g., the user has not yet implemented the configuration on network device 130(1)). Furthermore, key 350 may provide any suitable categorization indication of historical frequency, such as unique colors or symbols associated with various levels of historical frequency. In one specific example, individual terms in the configuration changes may be color coded based on the commonality of terms in previous configuration changes.

In one example, configuration change identification server 140 may generate an alert indicating that the one or more changes in the configuration of network device 130(1) have caused or will cause a networking issue in enterprise network 110. Thus, by taking previously known configuration change behaviors into consideration, information relating to the last known states of network device 130(1) may be applied for root cause analysis applications. For example, using the historical graphs and frequency analysis of terms, it may be determined that a configuration change that was made to network device 130(1) is considered "rare" and should therefore be treated with a higher degree of scrutiny than a change event that is common and occurs daily. This may help differentiate between routine maintenance scenarios and scenarios involving new optimizations of solutions or introduction of new technology. The latter scenarios may include keywords that have not been seen before, or have been seen before but at a relatively low frequency. In a further example, configuration change identification server 140 may automatically resolve the networking issue in enterprise network 110, for example, by updating the configuration of network device 130(1).

Configuration change identification server 140 may test graph 200C against the frequency model to enable overlaying term rarity to the configuration change and provide additional context. For example, frequency analysis and topic modeling may be performed on graph 200C to indicate whether a configuration occurs frequently based on engineer behavior and/or implementation practices. Graph 200C may be flagged as including a term or grouping of terms that are outside the scope of normal operating procedures. Over a given time period, by evaluating the frequency/commonality of keywords in graph 200C, certain events may be flagged in timeline 310. Not all configuration changes are necessarily bad, even rare changes, but a given configuration change that is uncommon for a given organization or engineer may warrant further inspection.

Figure 4:
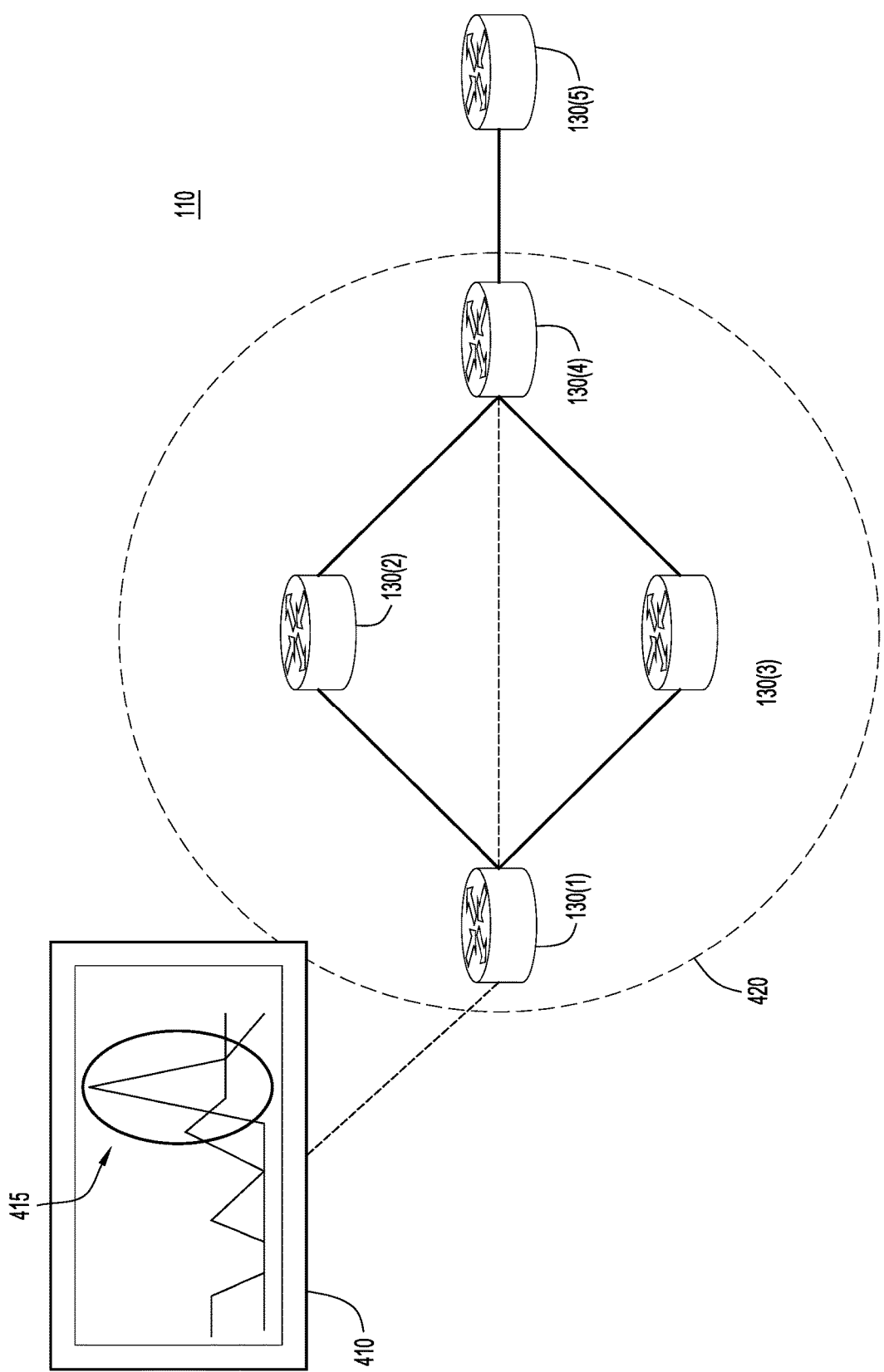
FIG. 4 illustrates a system in which one or more network device configuration changes cause a networking issue to propagate in a network, according to an example embodiment.

With continuing reference to FIG. 1, FIG. 4 illustrates enterprise network 110 when one or more configuration changes to network device 130(1) cause a networking issue to propagate in enterprise network 110. Network devices 130(1)-130(3) are upstream from network device 130(4) and therefore could potentially impact the operation of network device 130(4). In this example, an outage/event is reported on network device 130(4). Configuration change identification server 140 may analyze configuration changes to network devices 130(1)-130(N) and detect that network device 130(1) experienced an increase in the frequency of "rare" configuration changes based on the techniques described above with respect to FIGS. 2A-2C and FIGS. 3A and 3B. This increase is represented in chart 410 at area 415. The rare configuration change may be, for example, a particular policy that was manipulated by a user who has historically not manipulated that policy.

Configuration change identification server 140 may determine that the one or more changes to the configuration of network device 130(1) have caused a networking issue on network device 130(4). For example, if policy information is changed on network device 130(1), and network device 130(1) advertises that policy information to network device 130(4), the policy information may cause network device 130(4) to start blackballing traffic. Thus, based on the analysis, network devices 130(1)-130(3) may be considered to be within sphere of influence 420 of network device 130(4) and are therefore flagged as potential investigation points. Configuration change identification server 140 may develop sphere of influence 420 based on rarity and outage information. It will be appreciated that configuration change identification server 140 may similarly determine that one or more potential changes to the configuration of network device 130(1) will cause a networking issue on network device 130(4).

The knowledge of past configuration changes enables configuration change identification server 140 to rapidly surface causes of a network event and also provide a proactive safety net by predicting the potential negative outcomes of future configuration changes on network devices 130(1)-130(N). By using the frequency of commands executed by a network operator and aligning with physical and logical connectivity of network devices 130(1)-130(N), relationships may be created between rare or outlier behavior on network device 130(1) to identify downstream effects/impacts of network configuration changes.

Network device 130(1) may have logical or physical connectivity to network device 130(4), and need not necessarily be directly connected to network device 130(4). Network device 130(4) may have been impacted by the networking issue even if a directly connected peer is not impacted by the networking issue. The rare event(s) on network device 130(1) may have a negative impact on network device 130(4) even if network devices 130(1) and 130(4) are not physically connected. For example, multi-hop protocols do not necessarily require a physical connection to establish an adjacency. Network devices 130(1) may be a "peer of a peer" to network device 130(4) in the context of multi-hop Border Gateway Protocol (BGP) or protocols that do not require direct physical connectivity. Configuration change identification server 140 may determine how topologically distant network device 130(1) is from network device 130(4), which may provide a starting point to potentially identify the root cause. Configuration change identification server 140 may establish relationships between network devices 130(1) and 130(4) based on neighbor information and rarity.

The classification of rare events and configuration technology topics on network device 130(1) may provide insight when correlating other network events such as the networking issue on network device 130(4). By using time series information of configuration changes in conjunction with the frequency and rarity of events, configuration change identification server 140 may establish potential event correlation and investigation points by network devices that may be related, though not directly connected. For example, configuration change identification server 140 may identify a ripple area for a device and configuration change pairing. By using device metadata and additional sources for connectivity and relationship information, the ripple effect may connect network devices that may not have direct physical relationships. Configuration change identification server 140 may associate cause and effect type behavior within sphere of influence 420.

Configuration change identification server 140 may draw conclusions as to the results of actions on a network device based on the operation of network devices in topological proximity to the network device. Configuration change identification server 140 may evaluate the network device for a rare configuration change that occurred after the networking issue/event. This information may be back-fed to associate the affected configuration items with upstream candidates identified as being within sphere of influence 420. Configuration change identification server 140 may thereby evaluate and provide one or more metric(s) regarding the normal operating behavior of configuration changes. Configuration change identification server 140 may further determine whether a rare change may have impacted one or more of network devices 130(1)-130(N) by evaluating sphere of influence 420 (or a "ripple effect" throughout enterprise network 110).

Figure 5:
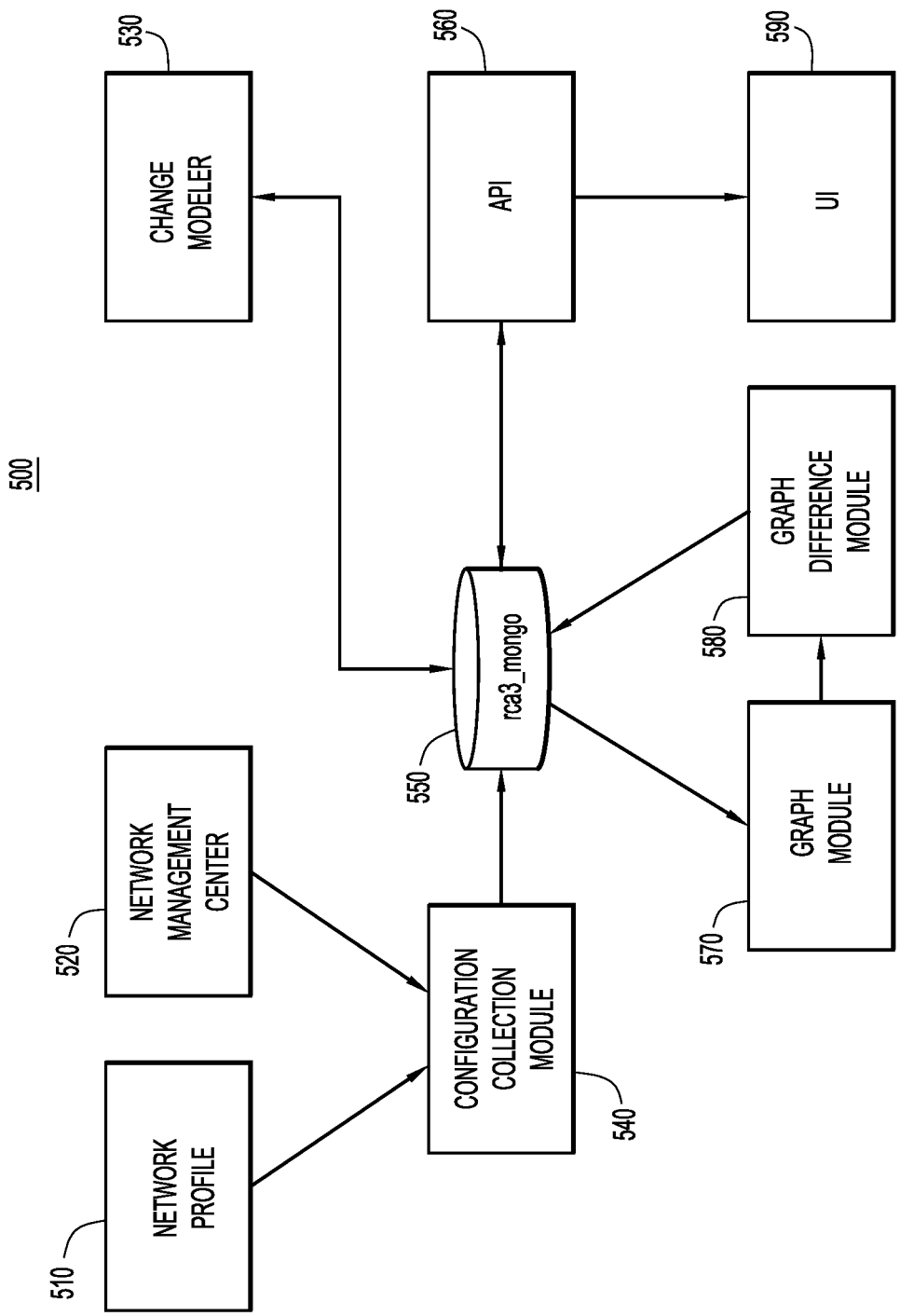
FIG. 5 illustrates a network architecture configured to identify one or more network device configuration changes, according to an example embodiment.

FIG. 5 illustrates an example network architecture 500 configured to identify one or more network device configuration changes. Network architecture 500 includes network profile 510, network management center 520, change modeler 530, configuration collection module 540, database 550, Application Programming Interface (API) 560, graph module 570, graph difference module 580, and User Interface (UI) 590.

The process flow for network architecture 500 may proceed as follows. Configuration collection module 540 may ingest new network device configurations from network profile 510 and/or network management center 520. In response, configuration collection module 540 may move the existing configuration in database 550 to a previous version, and replace the current version with the new network device configurations. Graph module 570 may convert the configuration to a graph database, preserving the hierarchy and relationship of configured components. Graph difference module 580 may store the difference(s) between the current and previous configurations as a graph including information regarding the change and where the change occurred within the hierarchy.

Change modeler 530 may construct a model based on the frequency of changes and the specific configuration change nodes. The frequency of configuration keywords and topics may determine whether a configuration change is considered to be part of normal operating procedure or a rare event. Change modeler 530 may also determine the category of the change request. API 560 may include a layer that references the historical list of configuration events for a device over time and overlay significance information based on the configuration frequency model. UI 590 may render a draggable timeline of configuration changes that have occurred on a device using a fish-bone graph. Events that are rare may be flagged with larger flag poles in the chart landscape.

Network architecture 500 may provide a real-time evaluation of an incoming configuration change and issue an appropriate warning. A proposed configuration may be tested against known configuration history to ensure accuracy of deployment. The proposed configuration may be tested as part of an on-box call to API 560, or as part of a change management check and balance. A warning may be sent if the proposed change configuration crosses a threshold of rarity, indicating that the proposal might require more scrutiny or verification before being pushed down into hardware. For example, if a known configuration change on a certain device has been linked with a higher percentage of outages, the user may be warned or the configuration change may be queued for additional approval. Thus, an early warning system may be provided that indicates whether a proposed set of changes will work.

Support services may also benefit from having historical changes of a device. Other devices in the network may be within the sphere of influence (ripple area) of a device when resolving service requests. Metadata associated with a configuration change indicating the rarity or commonality of the change behavior may provide context into the technology and/or configuration churn of an affected device. With this knowledge, customer experience automation, intellectual capital, and/or artificial intelligence may be focused to help remediate problems faster. Furthermore, customer experience artificial intelligence systems may learn by applying these techniques to many diverse customer networks and modeling the relationships between configuration changes to network events. This may allow for accurate and faster resolution of customer problems due to common configuration changes seen across thousands of different networks.

Learned frequency analysis from operational configuration changes may enrich the troubleshooting experience for network engineers. By establishing a timeline of events in the root cause analysis process, and overlaying those events with outlier configuration changes that deviate from normal operating behavior, these techniques may bring attention and focus to potential areas of impact for network outages and events.

Topic modeling and frequency analysis may also be applied to configuration change behavior. Machine learning and relating configuration behavior to technology and solution maturity milestones may provide a metric for how network operators are spending time and money when performing change management functions. Identifying the topics that align with command subsets frequently deployed by a customer may help automatically determine how far along the customer is in the lifecycle of a technology or solution. Historical configuration change graphs may be used when evaluating the success or failure of a configuration change.

Configuration change frequency and rarity may also be employed when identifying and correlating events in networks. By evaluating the frequency of configuration changes that occur in a network, sentiment and events that occur after a change may be associated. The rapid identification of rare events may serve as an early warning mechanism for identifying potential outages and assisting with troubleshooting.

A ripple area may also be identified for a device and configuration change pairing, enabling the prediction of the likelihood that an upcoming or real-time configuration change has caused or will cause a network event. By evaluating correlation points based on service requests or performance indicators, a sphere of influence may be established for a device triggered by the outcome of a configuration change. This information may be back-fed into the process and associated with configuration items during change management procedures to ensure that the "ripple effect" of a configuration change is expected or known.

Multiple resources may benefit from the historical configuration timelines, change management processes, and the identification of "common" versus "rare" configuration blocks. For example, support services may benefit from additional information pertaining to the previous known states of a device and the configuration path the device has taken to get to the current state. This information may be used to perform root cause analysis operations and potentially identify outlier behavior that could impact the device. Frequency analysis of configurations and commonality may also help identify the sophistication of a customer relative to a given technology. Topic modeling may enable the association of common configuration items with lifecycle milestones. An executive overview may also be displayed regarding recurring changes and the types of tasks typically performed by the customer, based on customer location in the solution lifecycle.

FIGS. 6-11 depict aspects related to case deflection prediction and historical configuration change analysis. Briefly, a set of configuration changes that caused a network impact may be determined to enable faster reactive measures and help engineers accelerate case resolution. The impact of a set of configuration changes on a network may be determined proactively—that is, before the impact has actually occurred. This may be useful to customers who would typically turn to technical assistance by opening Service Requests (SRs), which is a typically a reactive measure that requires time and effort to troubleshoot and resolve.

Improved understanding of configuration changes may help enactment of preemptive measures and reduce the number of SRs for a customer. Cases may be deflected by proactively warning customers of potentially problematic configuration changes before the changes are implemented (e.g., during a maintenance window or any other suitable time for vetting configuration commands). A sentiment may be assigned, and a confidence score generated, based on past customer behavior and outcomes of configuration changes.

These techniques may bridge the gap between historical configuration streams and SR sentiment. By assigning a confidence score to a proposed network change based on historical change data from SRs, incoming network device changes may be evaluated, the confidence of a SR being opened may be assessed against a network change, and alternative configuration templates may be proposed to avoid potential pitfalls and deflect cases.

A feedback loop and iterative modeling process may predict the potential case deflection based on historical configuration change data and customer impact. By analyzing configuration change data for a customer and comparing statements to sentiment models for SRs, the potential outcome of a change management window and an insertion point for making additional configuration recommendations against known best practice templates may be predicted. This change management pipeline may warn a customer of statistically risky configuration changes and offer recommendations as an alternative risk mitigation process.

Network operators may assess the impact of configuration changes on a network through the implementation of a confidence score. The confidence score may be (or be related to) the probability of a case being opened based on a given configuration change or collection of configuration changes. In addition, if the probability of an SR is high, the potential long-term impact of the change may be determined if an SR is opened. The confidence score may allow customers to evaluate incoming configuration differences as well as the potential impact on an SR before making changes on network device(s).

Historical configuration change snippets may drive SR sentiment and predicted risk analysis, and may make alternative configuration recommendations based on the sentiment model. A configuration vectorization model may predict the success or failure of a configuration change window. Sets of configurations may be mapped to SR data over time to identify the root cause configuration changes as SR histories are gathered. Configuration change history may be combined with SR satisfaction and sentiment to provide an incoming change pipeline and proactive risk analysis. Potential service impact to a customer network may be determined based upon historical change behavior.

Case deflection may occur when customers are properly warned that a proposed change may have unforeseen impact. An alternative recommendation engine may improve proactive change windows and improve customer sentiment. Furthermore, mapping SR confidence to configuration may extend associated data for developing new intellectual capital and best practices. Professional services may be armed with additional information regarding projected real-world outcomes of implementing configuration templates and configuration best practices.

FIGS. 6-9 relate to data collection and aggregation. Turning first to FIG. 6, shown is an example database 600 configured to store SR data. In this example, database 600 includes three example SRs. To build database 600, closed SRs may be gathered and filtered by keywords such as device crash, reloads, reboots, Return Material Authorization (RMA), time to resolution, etc. For example, as shown, SR Number 1 was related to a device crash, and was escalated to severity 1 and involved a significant amount of time and resources in resolving. The corresponding affected device data (e.g., device identifier 12074214, Network Equipment Vendor A, Series XYZ Switches), critical SR information, and creation date (e.g., 2020-01-29) may be stored for later use. The device identifier may be used as the primary key in database 600.

FIG. 7 illustrates an example database 700 configured to store configuration changes. Database 700 may be built from configuration differences for a product family and its devices. For every individual device (e.g., device identifier) monitored in a given product family, groupings (e.g., n-grams) may be created based on any configuration changes that occurred within a given amount of time (e.g., in the last seven days). Each row may represent a configuration grouping. For example, database 700 may store configuration changes as groupings, where each grouping has its own row. In this example, the configuration changes correspond to device identifier 12074214, which is in the Network Equipment Vendor A, Series XYZ Switches product family.

FIG. 8 illustrates an example database 800 configured to store SR data and/or configuration changes. In one example, database 600 and database 700 may be outer-joined to create database 800 (e.g., an intermediate database). Database 800 may include groups of the most recent configuration changes and associated/paired SR information, if any. Database 800 may help aggregate SR information for modeling and analytics.

Figure 9:
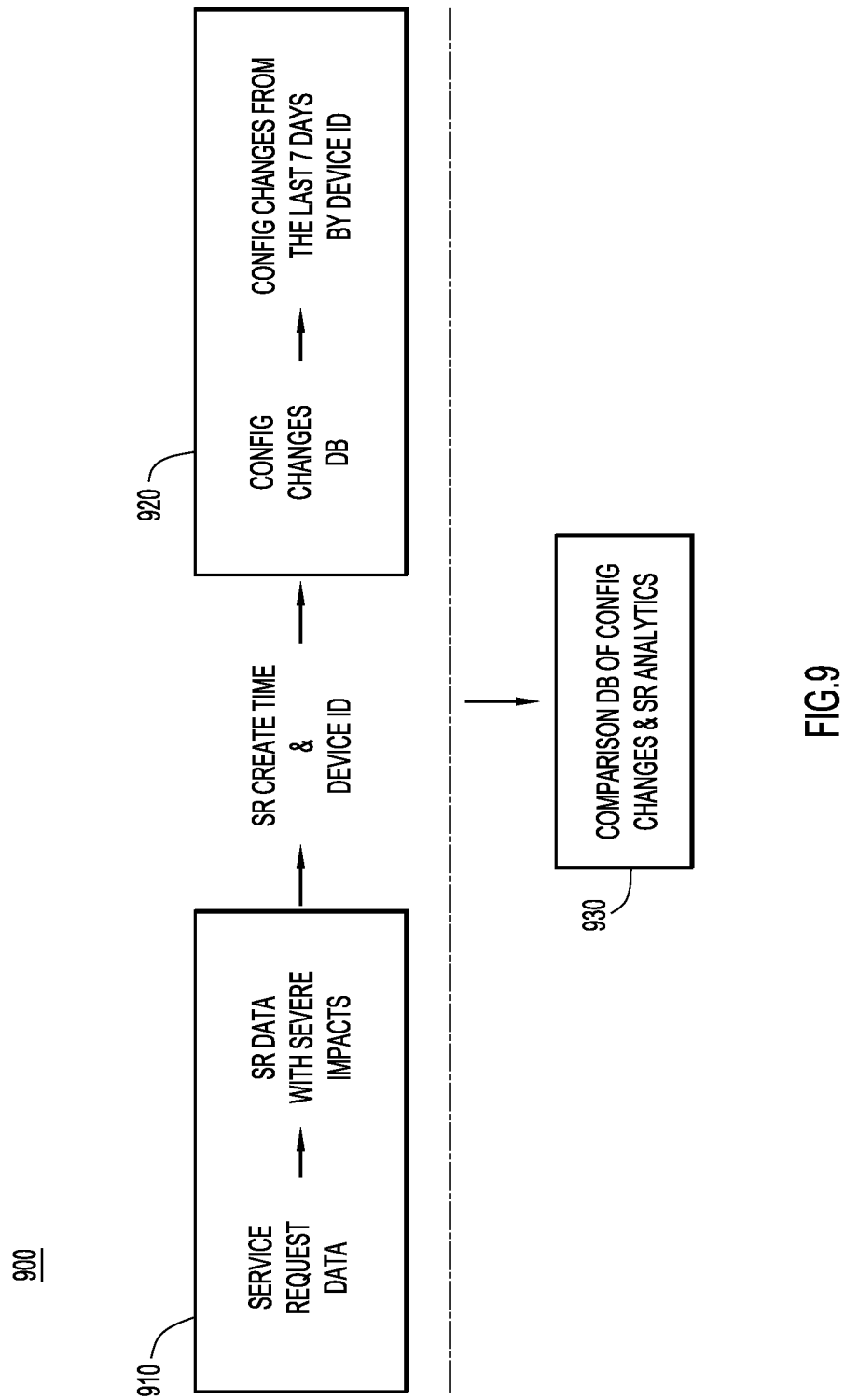
FIG. 9 illustrates a workflow for generating a database configured to store SR data and/or configuration changes, according to an example embodiment.

FIG. 9 illustrates an example workflow 900 for generating a database configured to store SR data and/or configuration changes. In one example, workflow 900 may enable data aggregation of configuration changes and SR analytics. As shown, a database 910 configured to store SR data (e.g., database 600) and a database 920 configured to store configuration changes (e.g., database 700) may be combined to generate a database 930 configured to store SR data and/or configuration changes (e.g., database 800). The database 910 configured to store SR data may include SR data with severe impacts on a network. The database 920 configured to store configuration changes may include configuration changes that occurred in the last seven days for a given device identifier.

Figure 11:
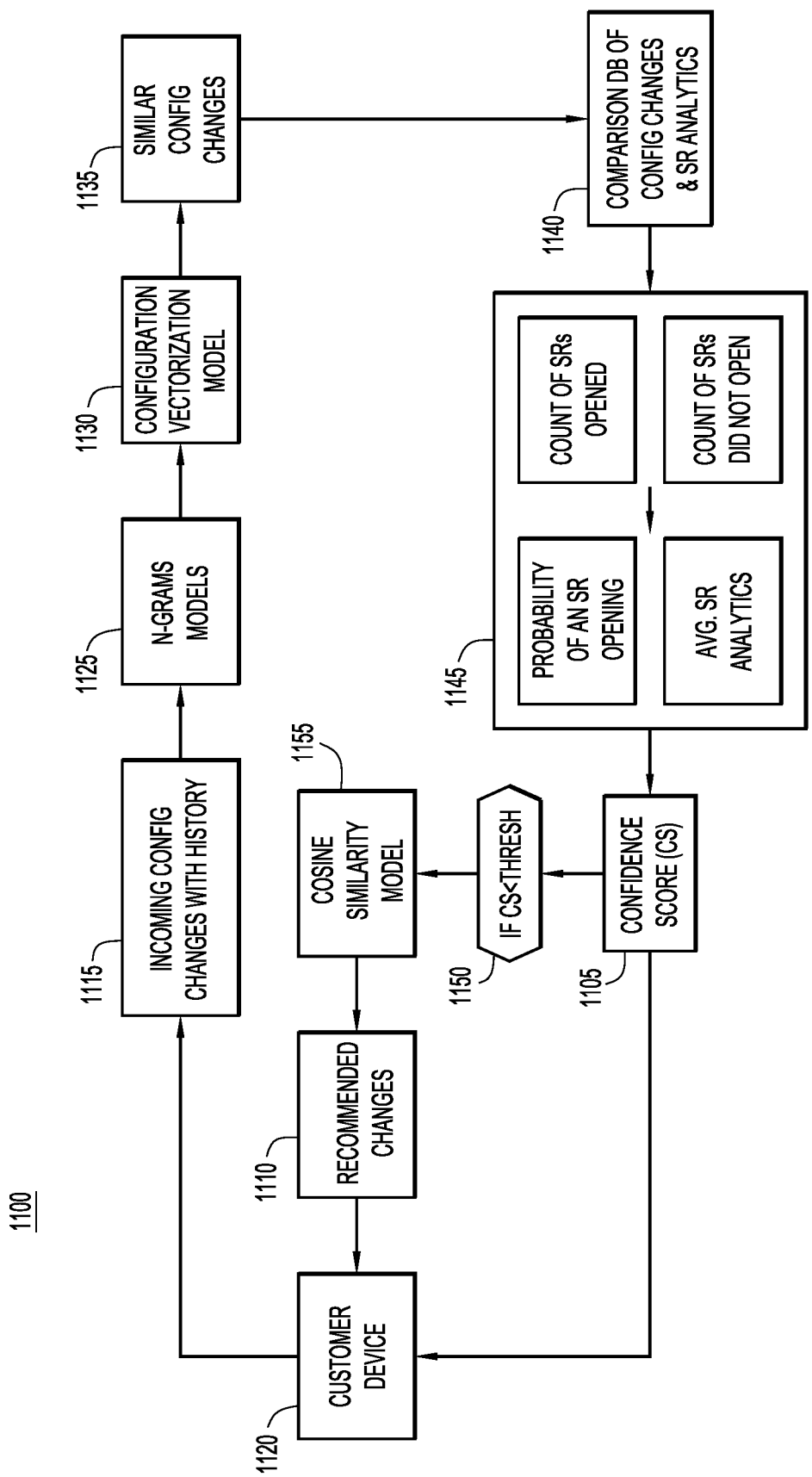
FIG. 11 illustrates a workflow for generating a confidence score corresponding to a configuration change, according to an example embodiment.

FIGS. 10 and 11 relate to modeling configuration changes and SR analytics. Turning first to FIG. 10, shown is an example database 1000 configured to store configuration scores associated with configuration changes. Database 1000 may be a comparison database that aggregates information associated with configuration changes using n-gram models and a trained configuration vectorization model. Database 1000 may generate a confidence score for all configuration changes (e.g., incoming configuration changes).

To generate database 1000, a configuration vectorization model may be trained that captures the context with which changes are made on a device. The configuration vectorization model may be trained using configuration histories for devices in a product family using database 700 (FIG. 7). The configuration vectorization model may be implemented to reduce the search space for a given configuration grouping. Using the configuration vectorization model, similar groupings of n-grams may be extracted from database 800 (FIG. 8).

Based on the similar groupings, the open case device counts and non-open case device counts may be used to compute the probability that a case (e.g., SR) will open based on its configuration changes. The probability of an SR opening given the configuration change may be computed from the counts. Because the SR histories are associated with certain configuration changes, the SR histories may be aggregated to produce the mean SR analytics for these groupings. This highlights the potential impact of an incoming configuration change given the associated history of that configuration change. For example, the first row of database

1000 shows a configuration change associated with three open SRs, and seven instances in which an SR was not opened. For the three SRs that were opened, their SR information is aggregated as a mean to generate mean SR information.

A weighted confidence score may be produced/created for a given configuration change from the associated SR information (e.g., the mean SR information). The confidence score for the configuration change may have a value between zero and one, where a higher confidence score indicates a better configuration change (e.g., a configuration change that is less likely to cause a networking issue). Example formulas for calculating the confidence score are provided as follows, where W=weight, Sev=severity, req=re-queue counts, sentiment=sentiment score (e.g., based on case notes), TTR=Total Time to Resolution, and Prob=probability.

Avg. Sev=(Avg. Sev/Max Sev)*$W$

Avg. Req=(Avg. Req/Max Req)*$W$

Avg. Sent=Sentiment*$W$

Avg. TTR=(Avg. TTR/Max TTR)*$W$

SR Prob=(1−Prob)*$W$

FIG. 11 illustrates an example workflow 1100 for generating a confidence score corresponding to a configuration change. In one example, confidence score 1105 and recommended changes 1110 may be generated given an incoming configuration change 1115 obtained from customer device 1120. The configuration change 1115 may be converted to N-grams models 1125, processed by configuration vectorization model 1130 to generate similar configuration changes 1135, and matched against a comparison database 1140 (e.g., database 1000). Similar configuration changes 1135, associated analytics 1145, confidence score 1105, and recommended changes 1110 may be shown to a customer in real time. If the confidence score 1105 for an incoming configuration change 1115 is below a given probability threshold as determined at operation 1150, a cosine similarity model 1155 may be used to find the closest matching golden template in real-time. The closest match template may be suggested to the customer as recommended changes 1110 for use over the incoming configuration change 1115.

These techniques may be employed by customers, professional services engineers who assist customers with network configuration and maintenance, and/or technical assistance engineers. Integrating configuration change information across thousands of SRs and associating the outcomes of those changes may assist engineers with configuring customer devices in real-time. For example, such engineers often make configuration changes in a customer network for testing or to resolve an issue. A warning may be provided to the engineers as commands are entered that have been shown to cause problems or issues based on other SRs. This warning may be provided through any suitable mechanism, such as font color. For example, green may indicate "safe," yellow may indicate "warning," and red may indicate "dangerous." An engineer may see commands come up as green or a standard font color in real-time, and the font color may change to yellow or red depending on the command or as certain command arguments are entered.

This may also act as a safety net for professional services engineers recommending best practice configuration changes and developing new intellectual capital. The implementation of best practices are not necessarily without service impact, and proactive engineers are often questioned by customers as to the potential impact of executing certain commands. Techniques described herein may enable an engineer or customer to gauge the potential impact of a best practice or intellectual capital implementation by calculating the confidence score based on historical change data and proactively ferreting out potential service impacts.

Thus, an integrated platform may be provided with device information and service request analytics. The platform may identify which configuration changes are high risk and might cause network or device impact (e.g., SR opening), and may be used to speed up troubleshooting on SRs. The confidence scores of configuration changes prior to the implementation of such changes may enable customers to be more cautious about changes made to their networks, and may assist customers to take any appropriate/necessary action(s) to ensure network functionality is uninterrupted. The number of technical assistance cases may be reduced by identifying possibly dangerous configuration changes as well as any necessary recommendations to be provided to customers.

Figure 12:
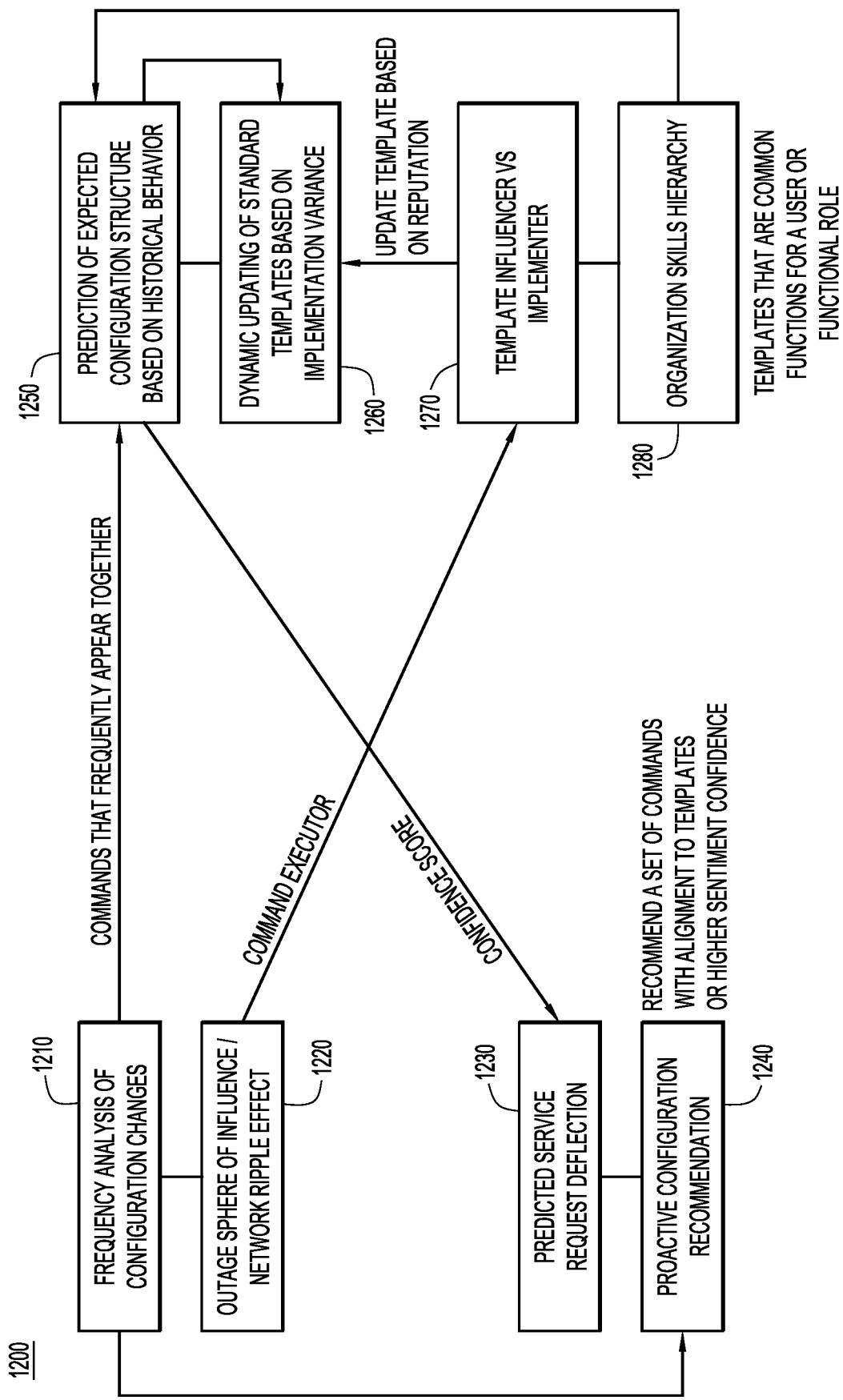
FIG. 12 illustrates a workflow for analyzing network device configurations, according to an example embodiment.
Figure 13:
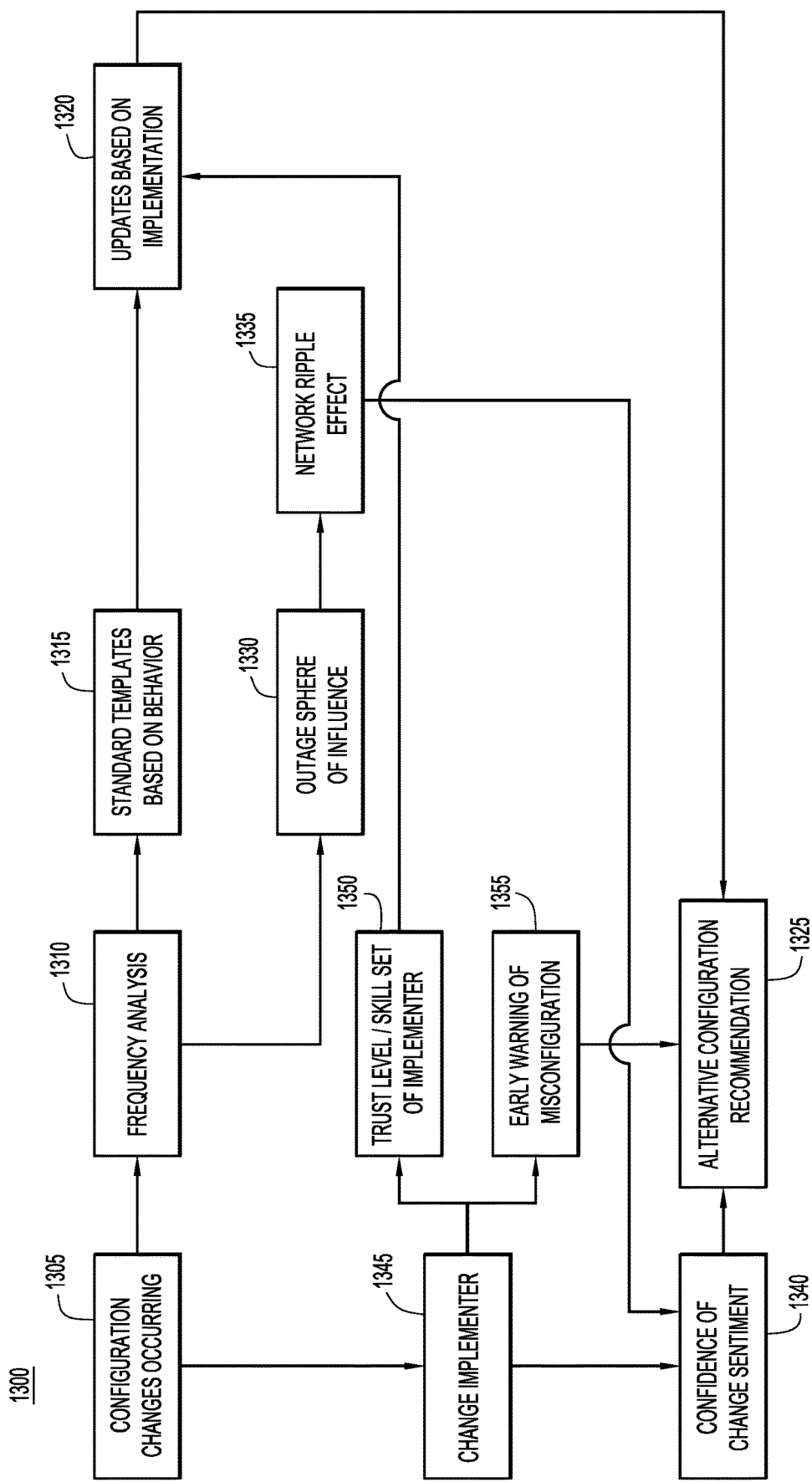
FIG. 13 illustrates another workflow for analyzing network device configurations, according to an example embodiment.

FIGS. 12 and 13 illustrate an analytics capability that detects configuration changes in network devices, associates themes and templates to network changes, and uses past knowledge of configuration change behavior to predict both sentiment and frequency of proposed change management and maintenance windows. Turning first to FIG. 12, shown is an example workflow 1200 for analyzing network device configurations in accordance with techniques described herein. Aspects 1210-1280 are shown with various interrelationships therebetween. Aspect 1210 corresponds to frequency analysis of configuration changes. Aspect 1220 corresponds to outage sphere of influence/network ripple effect. Aspect 1230 corresponds to predicted service request deflection. Aspect 1240 corresponds to proactive configuration recommendation. Aspect 1250 corresponds to prediction of expected configuration structure based on historical behavior. Aspect 1260 corresponds to dynamic updating of standard templates based on implementation variance. Aspect 1270 corresponds to template influencer versus implementer. Aspect 1280 corresponds to an organization skills hierarchy.

Aspect 1230 may use a confidence score that indicates an extent to which a template or collection of configurations will result in positive sentiment, obtained from aspect 1250. Aspect 1240 may recommend a set of commands with alignment to templates or higher sentiment confidence based on input obtained from aspect 1210. Aspect 1250 may use the indication of commands that frequently appear together, obtained from aspect 1210. Aspect 1250 may further use an indication of which templates are common functions from a user or functional role, obtained from aspect 1280. Aspect 1260 may update templates based on reputation as per input obtained from aspect 1270. Aspect may also obtained input from aspect 1250. Aspect 1270 may use a command executor, obtained from aspect 1210.

FIG. 13 illustrates an example workflow 1300 for analyzing network device configurations in accordance with techniques described herein. Aspect 1305 relates to the occurrence of configuration changes; aspect 1310 to frequency analysis; aspect 1315 to behavior-based standard templates; aspect 1320 to implementation-based updates; aspect 1325 to alternative configuration recommendations; aspect 1330 to the outage sphere of influence; aspect 1335 to the network ripple effect; aspect 1340 to the confidence of change sentiment; aspect 1345 to a change implementer; aspect 1350 to the trust level and/or skill set of the implementer; and aspect 1355 to early warning misconfiguration.

As represented by the arrows, respective aspects 1305-1355 may obtain/provide input from/to each other. For example, aspect 1310 (frequency analysis) may be enabled due to an indication of configuration changes obtained from aspect 1305.

Figure 14:
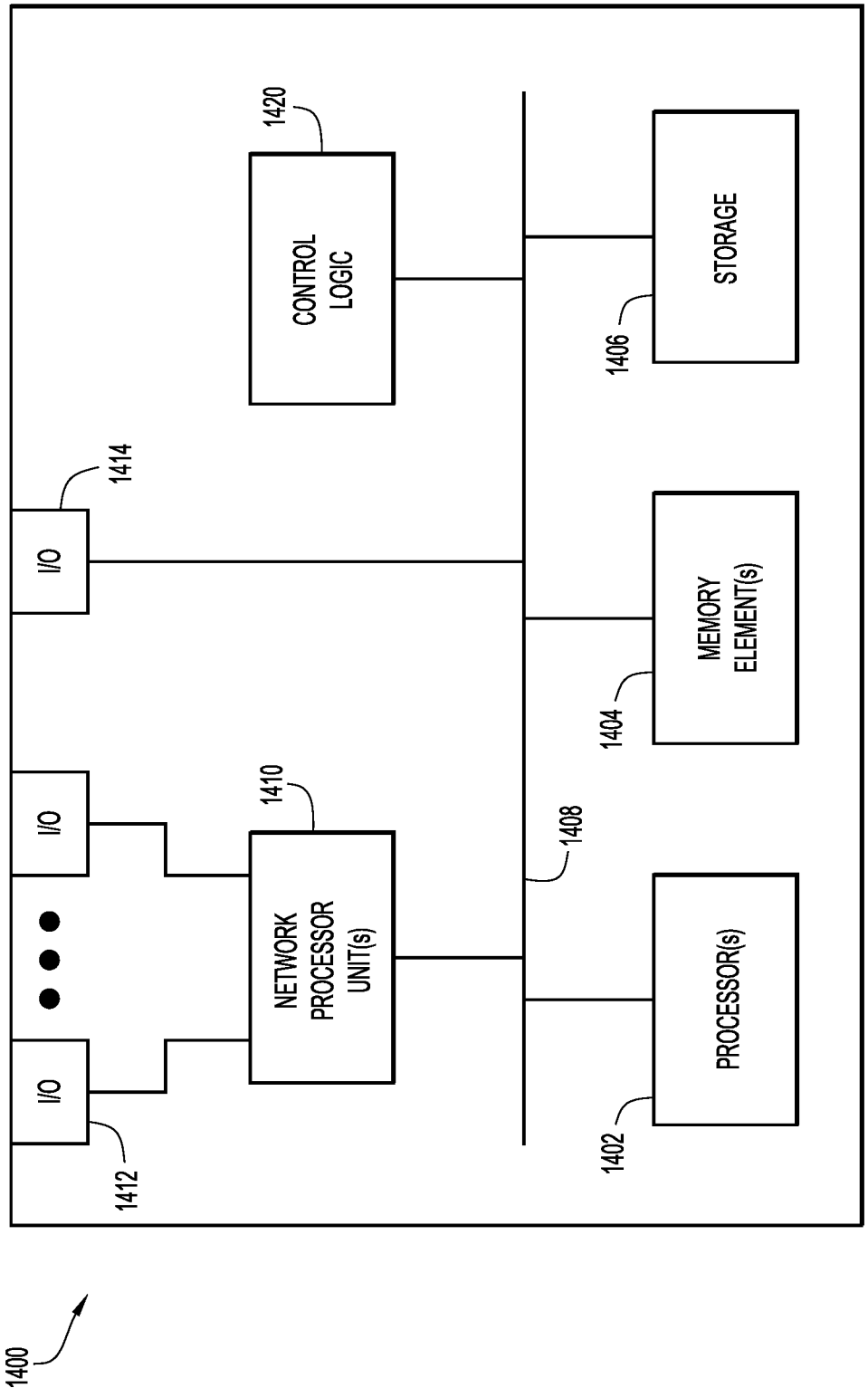
FIG. 14 illustrates a hardware block diagram of a computing device configured to perform functions associated with operations discussed herein, according to an example embodiment.

Referring to FIG. 14, FIG. 14 illustrates a hardware block diagram of a computing device 1400 that may perform functions associated with operations discussed herein in connection with the techniques depicted in FIGS. 1-13. In various embodiments, a computing device, such as computing device 1400 or any combination of computing devices 1400, may be configured as any entity/entities as discussed for the techniques depicted in connection with FIGS. 1-13 in order to perform operations of the various techniques discussed herein.

In at least one embodiment, computing device 1400 may include one or more processor(s) 1402, one or more memory element(s) 1404, storage 1406, a bus 1408, one or more network processor unit(s) 1410 interconnected with one or more network input/output (I/O) interface(s) 1412, one or more I/O interface(s) 1414, and control logic 1420. In various embodiments, instructions associated with logic for computing device 1400 can overlap in any manner and are not limited to the specific allocation of instructions and/or operations described herein.

In at least one embodiment, processor(s) 1402 is/are at least one hardware processor configured to execute various tasks, operations and/or functions for computing device 1400 as described herein according to software and/or instructions configured for computing device 1400. Processor(s) 1402 (e.g., a hardware processor) can execute any type of instructions associated with data to achieve the operations detailed herein. In one example, processor(s) 1402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1404 and/or storage 1406 is/are configured to store data, information, software, and/or instructions associated with computing device 1400, and/or logic configured for memory element(s) 1404 and/or storage 1406. For example, any logic described herein (e.g., control logic 1420) can, in various embodiments, be stored for computing device 1400 using any combination of memory element(s) 1404 and/or storage 1406. Note that in some embodiments, storage 1406 can be consolidated with memory elements 1404 (or vice versa), or can overlap/exist in any other suitable manner.

In at least one embodiment, bus 1408 can be configured as an interface that enables one or more elements of computing device 1400 to communicate in order to exchange information and/or data. Bus 1408 can be implemented with any architecture designed for passing control, data and/or information between processors, memory elements/storage, peripheral devices, and/or any other hardware and/or software components that may be configured for computing device 1400. In at least one embodiment, bus 1408 may be implemented as a fast kernel-hosted interconnect, potentially using shared memory between processes (e.g., logic), which can enable efficient communication paths between the processes.

In various embodiments, network processor unit(s) 1410 may enable communication between computing device 1400 and other systems, entities, etc., via network I/O interface(s) 1412 to facilitate operations discussed for various embodiments described herein. In various embodiments, network processor unit(s) 1410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1400 and other systems, entities, etc. to facilitate operations for various embodiments described herein. In various embodiments, network I/O interface(s) 1412 can be configured as one or more Ethernet port(s), Fibre Channel ports, and/or any other I/O port(s) now known or hereafter developed. Thus, the network processor unit(s) 1410 and/or network I/O interfaces 1412 may include suitable interfaces for receiving, transmitting, and/or otherwise communicating data and/or information in a network environment.

I/O interface(s) 1414 allow for input and output of data and/or information with other entities that may be connected to computing device 1400. For example, I/O interface(s) 1414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1420 can include instructions that, when executed, cause processor(s) 1402 to perform operations, which can include, but not be limited to, providing overall control operations of computing device 1400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1404 and/or storage 1406 can store data, software, code, instructions (e.g., processor instructions), logic, parameters, combinations thereof, and/or the like used for operations described herein. This includes memory elements 1404 and/or storage 1406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 1400 for transfer onto another computer readable storage medium.

Figure 15:
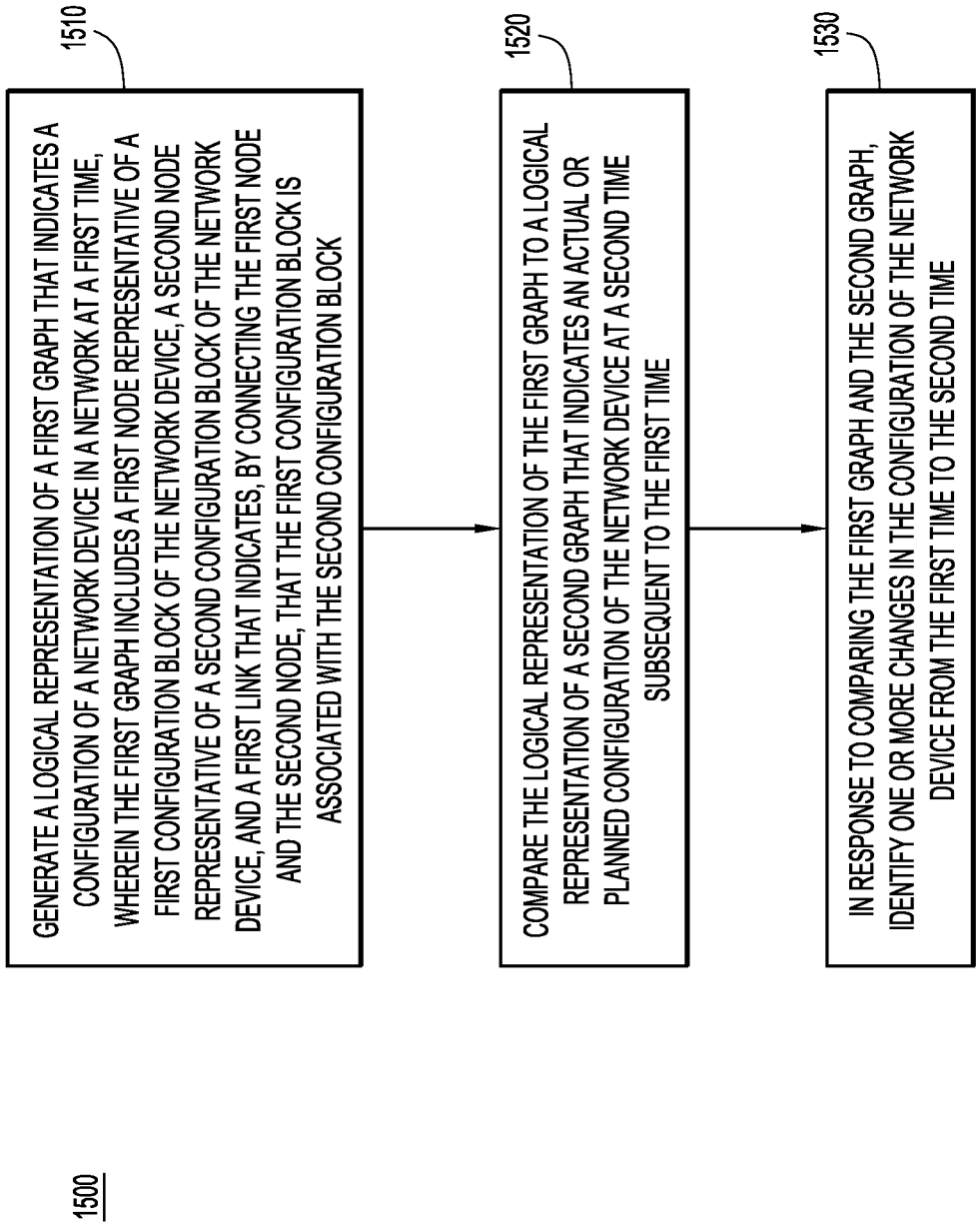
FIG. 15 illustrates a flowchart of a method for performing functions associated with operations discussed herein, according to an example embodiment.

FIG. 15 is a flowchart of an example method 1500 for performing functions associated with operations discussed herein. Method 1500 may be performed by any suitable entity, such as configuration change identification server 140 or computing device 1400. At operation 1510, a logical representation of a first graph is generated. The first graph indicates a configuration of a network device in a network at a first time. The first graph includes a first node representative of a first configuration block of the network device, a second node representative of a second configuration block of the network device, and a first link that indicates, by connecting the first node and the second node, that the first configuration block is associated with the second configuration block.

At operation 1520, the logical representation of the first graph is compared to a logical representation of a second graph that indicates an actual or planned configuration of the network device at a second time subsequent to the first time. At operation 1530, in response to comparing the first graph and the second graph, one or more changes in the configuration of the network device from the first time to the second time are identified.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

[owl] Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: generating a logical representation of a first graph that indicates a configuration of a network device in a network at a first time, wherein the first graph includes a first node representative of a first configuration block of the network device, a second node representative of a second configuration block of the network device, and a first link that indicates, by connecting the first node and the second node, that the first configuration block is associated with the second configuration block; comparing the logical representation of the first graph to a logical representation of a second graph that indicates an actual or planned configuration of the network device at a second time subsequent to the first time; and in response to comparing the first graph and the second graph, identifying one or more changes in the configuration of the network device from the first time to the second time.

In one example, the method further comprises: generating a logical representation of a third graph that indicates the one or more changes in the configuration of the network device from the first time to the second time.

In one example, the second graph includes the first node, a third node representative of a third configuration block of the network device, and a second link that indicates, by connecting the first node and the third node, that the first configuration block is associated with the third configuration block, and wherein identifying the one or more changes in the configuration of the network device includes: determining that the actual or planned configuration of the network device adds an association of the third configuration block with the first configuration block.

In one example, the second graph excludes the first link, and wherein identifying the one or more changes in the configuration of the network device includes: determining that the actual or planned configuration of the network device removes an association of the first configuration block with the second configuration block.

In one example, generating the logical representation of the first graph includes: generating a logical representation of a directed graph that includes the first node, the second node, and the first link, wherein the first link is directed from the first node to the second node.

In one example, the method further comprises: computing one or more timestamps of the one or more changes in the configuration of the network device; and associating the one or more timestamps with the one or more changes in the configuration of the network device.

In one example, the method further comprises: identifying one or more implementers of the one or more changes in the configuration of the network device; and associating the one or more implementers with the one or more changes in the configuration of the network device.

In one example, the method further comprises: generating a timeline of the one or more changes in the configuration of the network device.

In one example, the method further comprises: calculating a historical frequency of one or more configuration blocks of the actual or planned configuration of the network device.

In one example, the method further comprises: determining that the one or more changes in the configuration of the network device have caused or will cause a networking issue on another network device in the network.

In one example, the method further comprises: generating an alert indicating that the one or more changes in the configuration of the network device have caused or will cause a networking issue in the network.

In another form, an apparatus is provided. The apparatus comprises: a network interface configured to obtain or provide network communications; and one or more processors coupled to the network interface, wherein the one or more processors are configured to: generate a logical representation of a first graph that indicates a configuration of a network device in a network at a first time, wherein the first graph includes a first node representative of a first configuration block of the network device, a second node representative of a second configuration block of the network device, and a first link that indicates, by connecting the first node and the second node, that the first configuration block is associated with the second configuration block; compare the logical representation of the first graph to a logical representation of a second graph that indicates an actual or planned configuration of the network device at a second time subsequent to the first time; and in response to comparing the first graph and the second graph, identify one or more changes in the configuration of the network device from the first time to the second time.

In another form, one or more non-transitory computer readable storage media are provided. The non-transitory computer readable storage media are encoded with instructions that, when executed by a processor, cause the processor to: generate a logical representation of a first graph that indicates a configuration of a network device in a network at a first time, wherein the first graph includes a first node representative of a first configuration block of the network device, a second node representative of a second configuration block of the network device, and a first link that indicates, by connecting the first node and the second node, that the first configuration block is associated with the second configuration block; compare the logical representation of the first graph to a logical representation of a second graph that indicates an actual or planned configuration of the network device at a second time subsequent to the first time; and in response to comparing the first graph and the second graph, identify one or more changes in the configuration of the network device from the first time to the second time.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   generating a logical representation of a first graph that indicates a configuration of a network device in a network at a first time, wherein the first graph includes a first node representative of a first configuration block of the network device, a second node representative of a second configuration block of the network device, and a first link that indicates, by connecting the first node and the second node, that the first configuration block is associated with the second configuration block;
   comparing the logical representation of the first graph to a logical representation of a second graph that indicates an actual or planned configuration of the network device at a second time subsequent to the first time; and
   in response to comparing the first graph and the second graph, identifying one or more changes in the configuration of the network device from the first time to the second time.

2. The method of claim 1, further comprising:
   generating a logical representation of a third graph that indicates the one or more changes in the configuration of the network device from the first time to the second time.

3. The method of claim 1, wherein the second graph includes the first node, a third node representative of a third configuration block of the network device, and a second link that indicates, by connecting the first node and the third node, that the first configuration block is associated with the third configuration block, and wherein identifying the one or more changes in the configuration of the network device includes:
   determining that the actual or planned configuration of the network device adds an association of the third configuration block with the first configuration block.

4. The method of claim 1, wherein the second graph excludes the first link, and wherein identifying the one or more changes in the configuration of the network device includes:
   determining that the actual or planned configuration of the network device removes an association of the first configuration block with the second configuration block.

5. The method of claim 1, wherein generating the logical representation of the first graph includes:
   generating a logical representation of a directed graph that includes the first node, the second node, and the first link, wherein the first link is directed from the first node to the second node.

6. The method of claim 1, further comprising:
   computing one or more timestamps of the one or more changes in the configuration of the network device; and
   associating the one or more timestamps with the one or more changes in the configuration of the network device.

7. The method of claim 1, further comprising:
   identifying one or more implementers of the one or more changes in the configuration of the network device; and
   associating the one or more implementers with the one or more changes in the configuration of the network device.

8. The method of claim 1, further comprising:
   generating a timeline of the one or more changes in the configuration of the network device.

9. The method of claim 1, further comprising:
   calculating a historical frequency of one or more configuration blocks of the actual or planned configuration of the network device.

10. The method of claim 1, further comprising:
    determining that the one or more changes in the configuration of the network device have caused or will cause a networking issue on another network device in the network.

11. The method of claim 1, further comprising:
    generating an alert indicating that the one or more changes in the configuration of the network device have caused or will cause a networking issue in the network.

12. An apparatus comprising:
    a network interface configured to obtain or provide network communications; and
    one or more hardware processors coupled to the network interface, wherein the one or more hardware processors are configured to:
       generate a logical representation of a first graph that indicates a configuration of a network device in a network at a first time, wherein the first graph includes a first node representative of a first configuration block of the network device, a second node representative of a second configuration block of the network device, and a first link that indicates, by connecting the first node and the second node, that the first configuration block is associated with the second configuration block;

compare the logical representation of the first graph to a logical representation of a second graph that indicates an actual or planned configuration of the network device at a second time subsequent to the first time; and in response to comparing the first graph and the second graph, identify one or more changes in the configuration of the network device from the first time to the second time.

13. The apparatus of claim 12, wherein the one or more hardware processors are further configured to:

generate a logical representation of a third graph that indicates the one or more changes in the configuration of the network device from the first time to the second time.

14. The apparatus of claim 12, wherein the second graph includes the first node, a third node representative of a third configuration block of the network device, and a second link that indicates, by connecting the first node and the third node, that the first configuration block is associated with the third configuration block, and wherein the one or more hardware processors are further configured to:

determine that the actual or planned configuration of the network device adds an association of the third configuration block with the first configuration block.

15. The apparatus of claim 12, wherein the second graph excludes the first link, and wherein the one or more hardware processors are further configured to:

determine that the actual or planned configuration of the network device removes an association of the first configuration block with the second configuration block.

16. The apparatus of claim 12, wherein the one or more hardware processors are further configured to:

generate a logical representation of a directed graph that includes the first node, the second node, and the first link, wherein the first link is directed from the first node to the second node.

17. One or more non-transitory computer readable storage media encoded with instructions that, when executed by a processor, cause the processor to:

generate a logical representation of a first graph that indicates a configuration of a network device in a network at a first time, wherein the first graph includes a first node representative of a first configuration block of the network device, a second node representative of a second configuration block of the network device, and a first link that indicates, by connecting the first node and the second node, that the first configuration block is associated with the second configuration block;

compare the logical representation of the first graph to a logical representation of a second graph that indicates an actual or planned configuration of the network device at a second time subsequent to the first time; and in response to comparing the first graph and the second graph, identify one or more changes in the configuration of the network device from the first time to the second time.

18. The one or more non-transitory computer readable storage media of claim 17, wherein the instructions further cause the processor to:

generate a logical representation of a third graph that indicates the one or more changes in the configuration of the network device from the first time to the second time.

19. The one or more non-transitory computer readable storage media of claim 17, wherein the second graph includes the first node, a third node representative of a third configuration block of the network device, and a second link that indicates, by connecting the first node and the third node, that the first configuration block is associated with the third configuration block, and wherein the instructions further cause the processor to:

determine that the actual or planned configuration of the network device adds an association of the third configuration block with the first configuration block.

20. The one or more non-transitory computer readable storage media of claim 17, wherein the second graph excludes the first link, and wherein the instructions further cause the processor to:

determine that the actual or planned configuration of the network device removes an association of the first configuration block with the second configuration block.

* * * * *